(12) United States Patent
Yamamoto et al.

(10) Patent No.: US 9,025,035 B2
(45) Date of Patent: May 5, 2015

(54) ZOOM LENS, IMAGING OPTICAL DEVICE, AND DIGITAL DEVICE

(75) Inventors: Yasushi Yamamoto, Chiyoda-ku (JP); Shoji Kogo, Chiyoda-ku (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/004,090

(22) PCT Filed: Feb. 22, 2012

(86) PCT No.: PCT/JP2012/054272
§ 371 (c)(1),
(2), (4) Date: Sep. 9, 2013

(87) PCT Pub. No.: WO2012/121014
PCT Pub. Date: Sep. 13, 2012

(65) Prior Publication Data
US 2013/0342716 A1    Dec. 26, 2013

(30) Foreign Application Priority Data

Mar. 8, 2011    (JP) .................. 2011-049799

(51) Int. Cl.
*H04N 5/228*    (2006.01)
*G02B 15/14*    (2006.01)
*G02B 27/64*    (2006.01)
*G02B 15/17*    (2006.01)
*H04N 5/222*    (2006.01)

(52) U.S. Cl.
CPC ............. *G02B 15/14* (2013.01); *G02B 27/646* (2013.01); *H04N 5/222* (2013.01); *G02B 15/17* (2013.01)

(58) Field of Classification Search
CPC ...... G02B 15/17; G02B 15/14; G02B 27/646; H04N 5/222
USPC .............................. 348/208.11; 359/557, 684
See application file for complete search history.

(56) References Cited

U.S. PATENT DOCUMENTS

| | | |
|---|---|---|
| 4,871,240 A | 10/1989 | Suda |
| 5,442,485 A | 8/1995 | Yamanashi |
| 5,499,141 A * | 3/1996 | Ohtake .................. 359/684 |
| 5,745,298 A | 4/1998 | Yahagi |
| 5,946,145 A | 8/1999 | Ohtake |
| 6,147,810 A | 11/2000 | Misaka |
| 2008/0112064 A1 | 5/2008 | Ishii et al. |
| 2010/0091174 A1 | 4/2010 | Miyazaki et al. |
| 2010/0290131 A1 | 11/2010 | Muramatsu |

FOREIGN PATENT DOCUMENTS

| | | |
|---|---|---|
| JP | 63-157119 | 6/1988 |
| JP | 5-341188 | 12/1993 |
| JP | 6-34885 | 2/1994 |
| JP | 6-194574 | 7/1994 |

(Continued)

*Primary Examiner* — Antoinette Spinks
(74) *Attorney, Agent, or Firm* — Cozen O'Connor

(57) ABSTRACT

Disclosed is a zoom lens that forms an optical image of an object on a light receiving surface of an imaging element converting the optical image to an electrical signal, having the diagonal length of 2Ymax, is constituted by a positive first group, a negative second group, a negative third group, an aperture, and a rear group having positive power as a whole, in order from an object side, and satisfies a conditional expression 1.5<frw/Ymax<2.1 (frw denotes the combined focal length of the rear group on a wide end, and Ymax denotes the maximum image height).

18 Claims, 23 Drawing Sheets

(56) References Cited

FOREIGN PATENT DOCUMENTS

| JP | 8-201697 | 8/1996 |
|----|----------|--------|
| JP | 10-48518 | 2/1998 |
| JP | 10-62688 | 3/1998 |
| JP | 10-142506 | 5/1998 |
| JP | 11-44848 | 2/1999 |
| JP | 2003-329933 | 11/2003 |
| JP | 2008-122676 | 5/2008 |
| JP | 2009-251118 | 10/2009 |
| JP | 2010-266534 | 11/2010 |

* cited by examiner

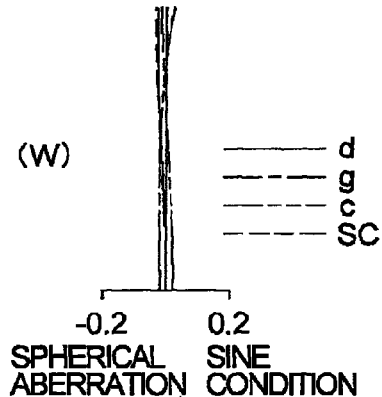
FIG.12A (EX1)
FNO=2.85
(W)
SPHERICAL ABERRATION / SINE CONDITION
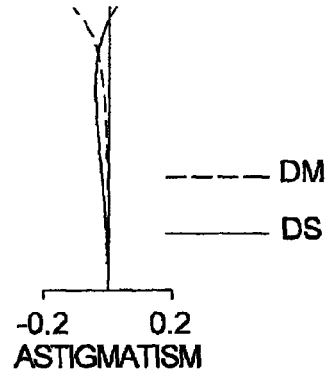
FIG.12B (EX1)
Y'=10.8
ASTIGMATISM
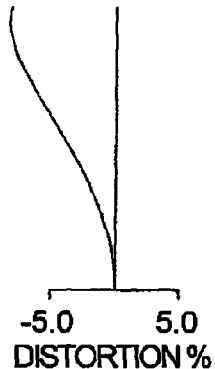
FIG.12C (EX1)
Y'=10.8
DISTORTION %
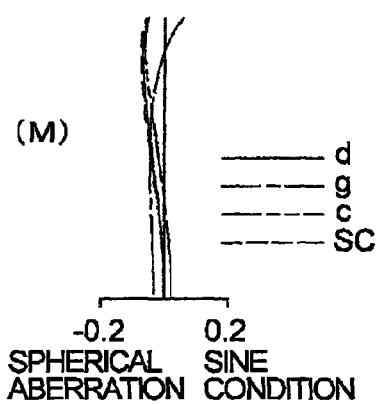
FIG.12D (EX1)
FNO=2.85
(M)
SPHERICAL ABERRATION / SINE CONDITION
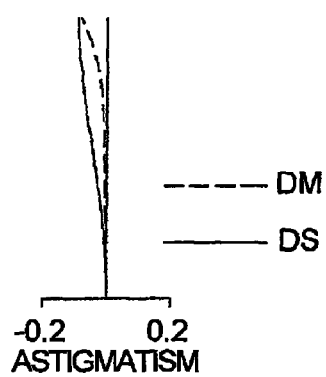
FIG.12E (EX1)
Y'=10.8
ASTIGMATISM
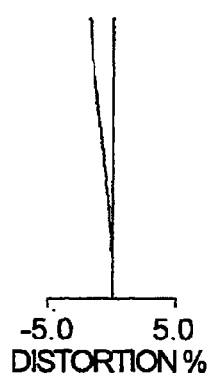
FIG.12F (EX1)
Y'=10.8
DISTORTION %
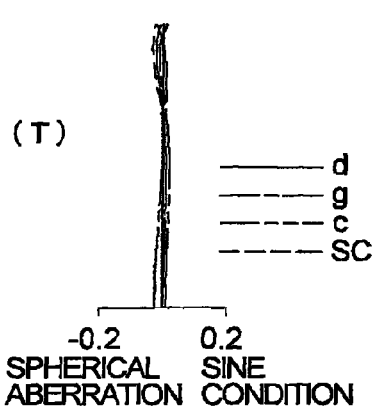
FIG.12G (EX1)
FNO=2.85
(T)
SPHERICAL ABERRATION / SINE CONDITION
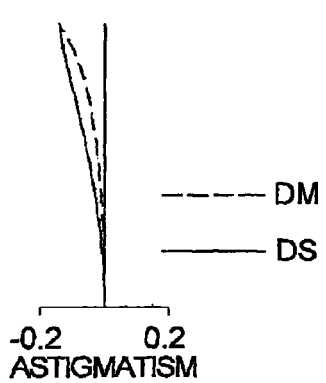
FIG.12H (EX1)
Y'=10.8
ASTIGMATISM
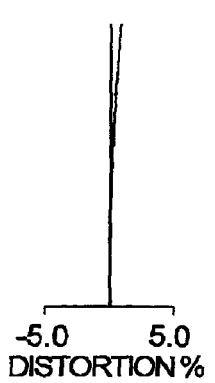
FIG.12I (EX1)
Y'=10.8
DISTORTION %

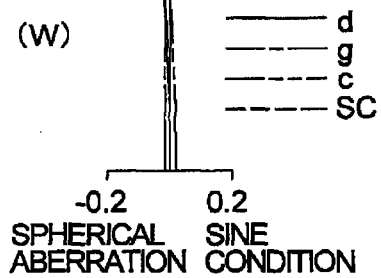

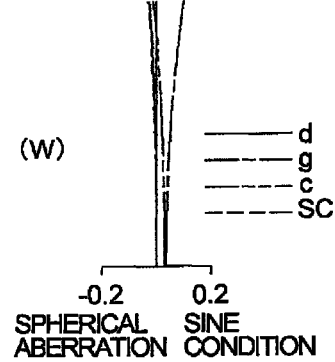
FIG.14A (EX3)
FNO=2.85
(W)
SPHERICAL ABERRATION SINE CONDITION
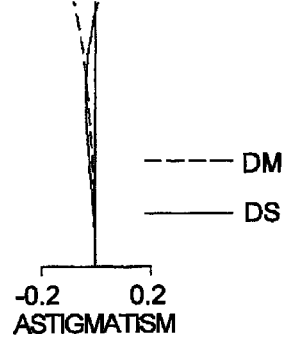
FIG.14B (EX3)
Y'=10.8
ASTIGMATISM
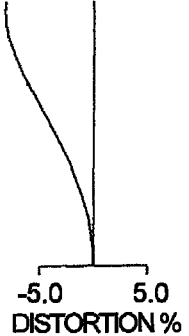
FIG.14C (EX3)
Y'=10.8
DISTORTION %
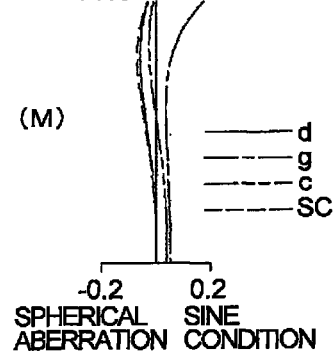
FIG.14D (EX3)
FNO=2.85
(M)
SPHERICAL ABERRATION SINE CONDITION
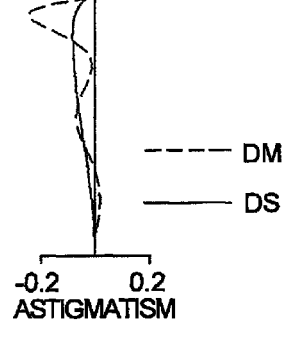
FIG.14E (EX3)
Y'=10.8
ASTIGMATISM
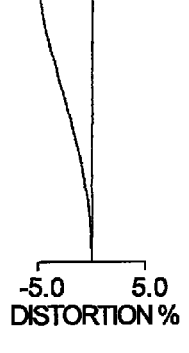
FIG.14F (EX3)
Y'=10.8
DISTORTION %
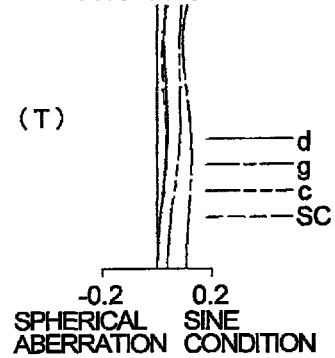
FIG.14G (EX3)
FNO=2.85
(T)
SPHERICAL ABERRATION SINE CONDITION
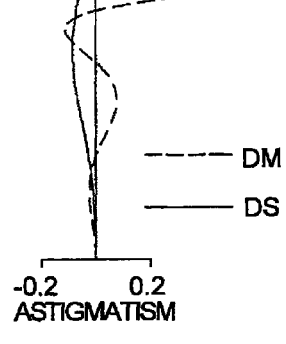
FIG.14H (EX3)
Y'=10.8
ASTIGMATISM
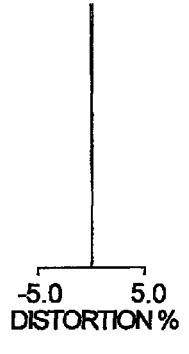
FIG.14I (EX3)
Y'=10.8
DISTORTION %

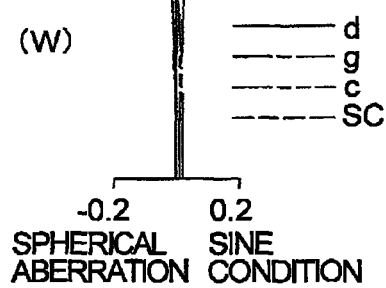
FIG.15A (EX4) FNO=2.85 (W)
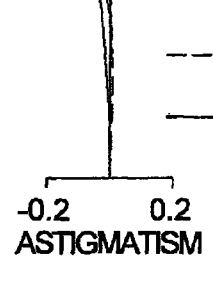
FIG.15B (EX4) Y'=10.8
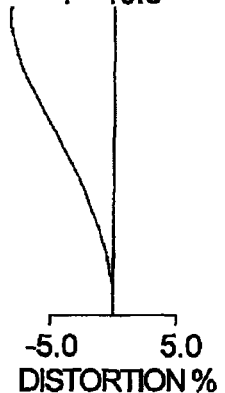
FIG.15C (EX4) Y'=10.8
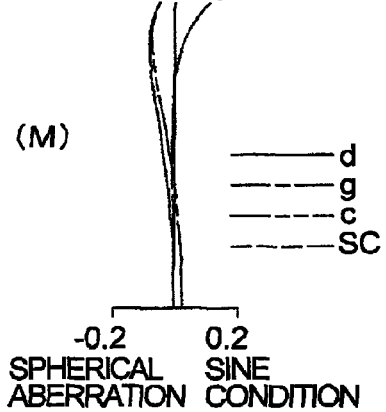
FIG.15D (EX4) FNO=2.85 (M)
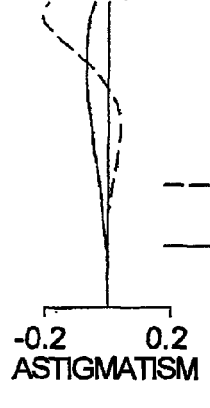
FIG.15E (EX4) Y'=10.8
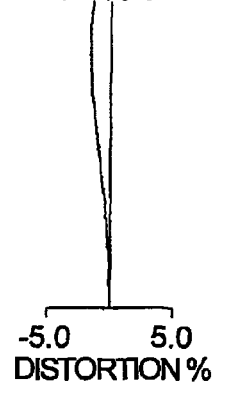
FIG.15F (EX4) Y'=10.8
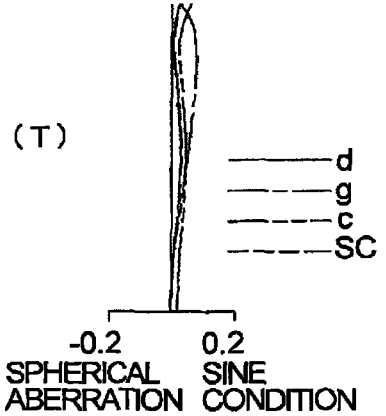
FIG.15G (EX4) FNO=2.85 (T)
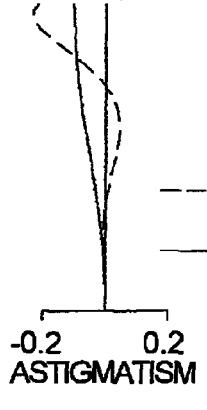
FIG.15H (EX4) Y'=10.8
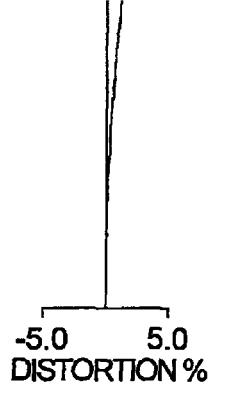
FIG.15I (EX4) Y'=10.8

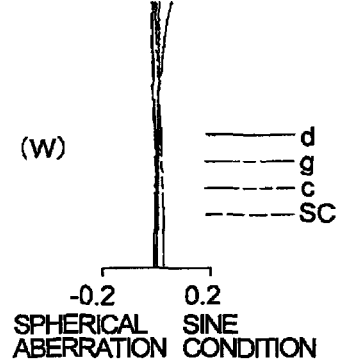
FIG.16A (EX5)
FNO=2.85
(W)
SPHERICAL ABERRATION SINE CONDITION
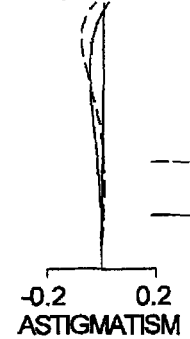
FIG.16B (EX5)
Y'=10.8
ASTIGMATISM
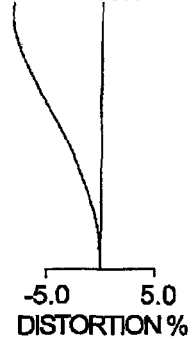
FIG.16C (EX5)
Y'=10.8
DISTORTION %
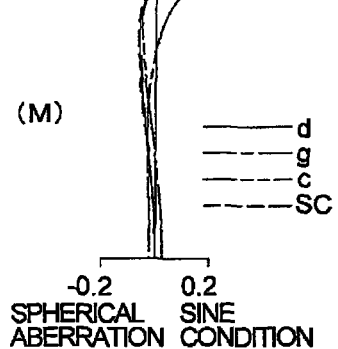
FIG.16D (EX5)
FNO=2.85
(M)
SPHERICAL ABERRATION SINE CONDITION
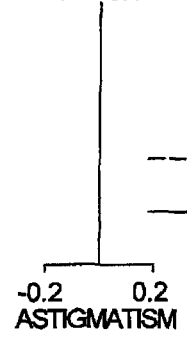
FIG.16E (EX5)
Y'=10.8
ASTIGMATISM
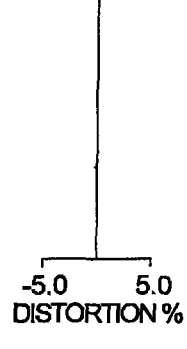
FIG.16F (EX5)
Y'=10.8
DISTORTION %
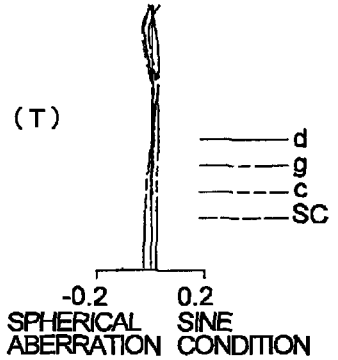
FIG.16G (EX5)
FNO=2.85
(T)
SPHERICAL ABERRATION SINE CONDITION
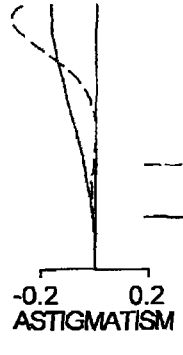
FIG.16H (EX5)
Y'=10.8
ASTIGMATISM
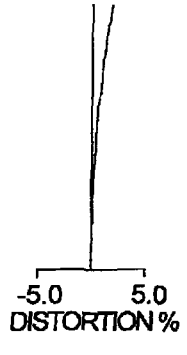
FIG.16I (EX5)
Y'=10.8
DISTORTION %

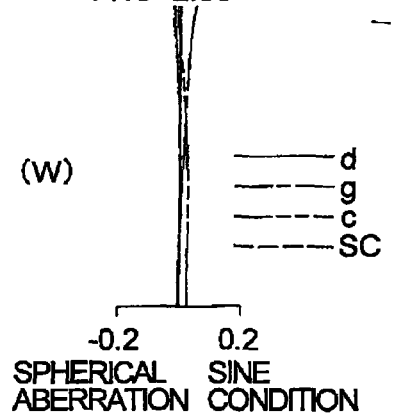
FIG.17A (EX6)
FNO=2.88
(W)
SPHERICAL ABERRATION SINE CONDITION
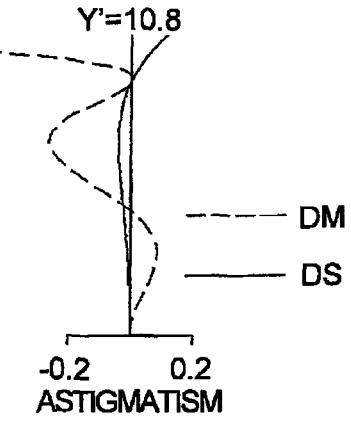
FIG.17B (EX6)
Y'=10.8
ASTIGMATISM
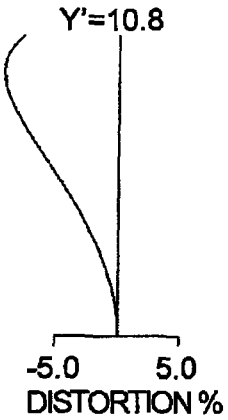
FIG.17C (EX6)
Y'=10.8
DISTORTION %
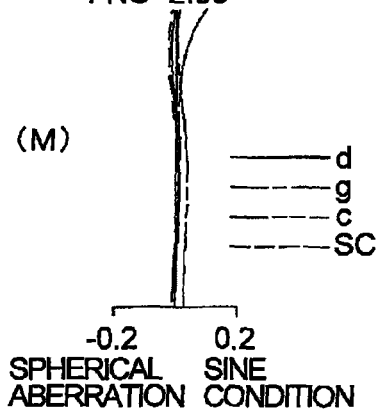
FIG.17D (EX6)
FNO=2.88
(M)
SPHERICAL ABERRATION SINE CONDITION
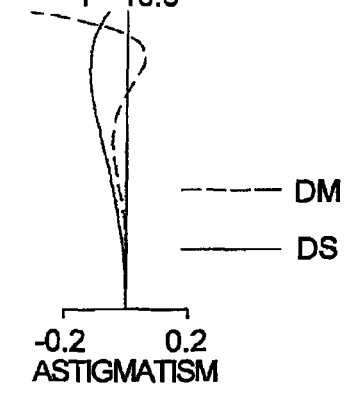
FIG.17E (EX6)
Y'=10.8
ASTIGMATISM
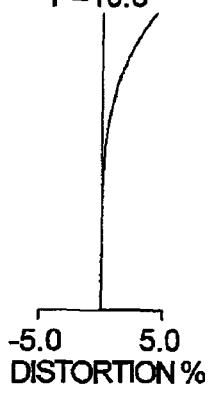
FIG.17F (EX6)
Y'=10.8
DISTORTION %
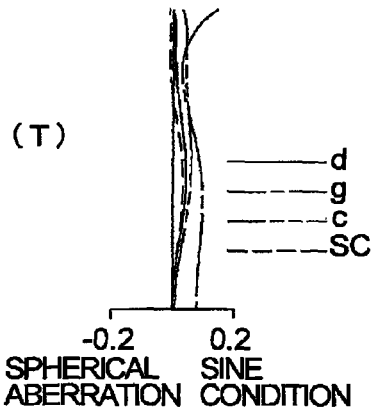
FIG.17G (EX6)
FNO=2.88
(T)
SPHERICAL ABERRATION SINE CONDITION
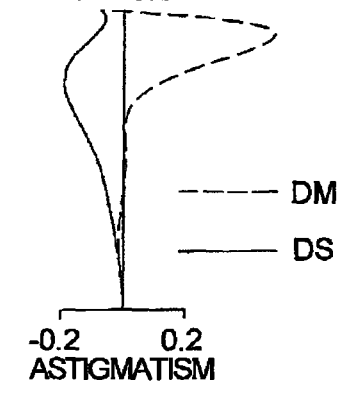
FIG.17H (EX6)
Y'=10.8
ASTIGMATISM
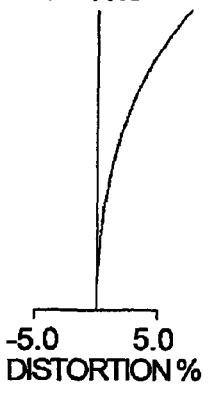
FIG.17I (EX6)
Y'=10.8
DISTORTION %

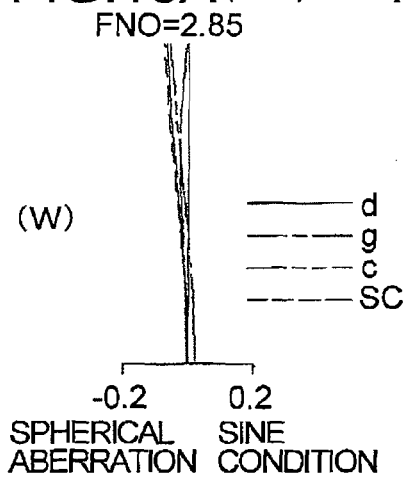
FIG.18A (EX7) FNO=2.85
(W)
d / g / c / SC
SPHERICAL ABERRATION  SINE CONDITION
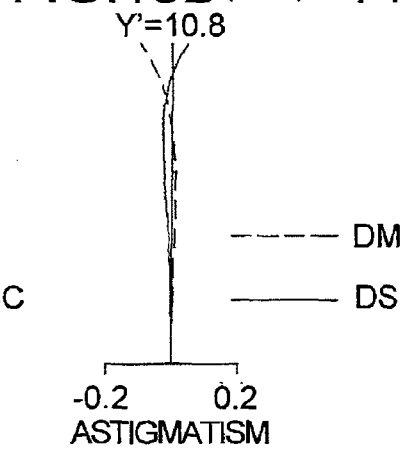
FIG.18B (EX7) Y'=10.8
DM / DS
ASTIGMATISM
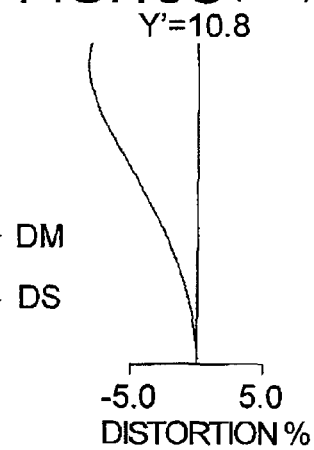
FIG.18C (EX7) Y'=10.8
DISTORTION %
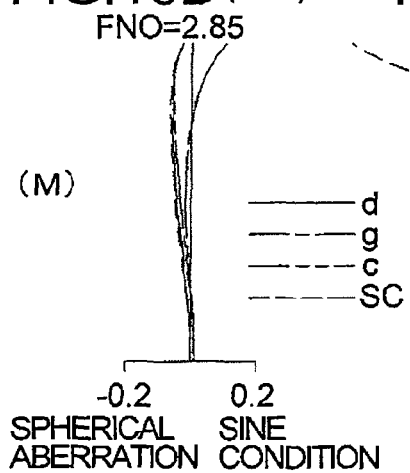
FIG.18D (EX7) FNO=2.85
(M)
d / g / c / SC
SPHERICAL ABERRATION  SINE CONDITION
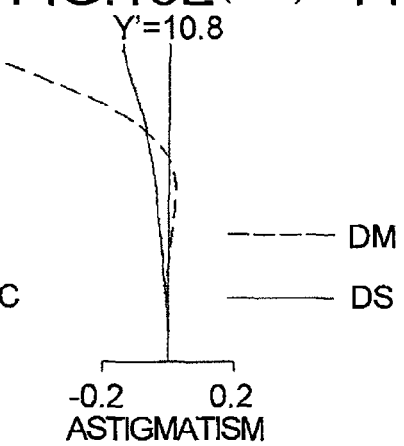
FIG.18E (EX7) Y'=10.8
DM / DS
ASTIGMATISM
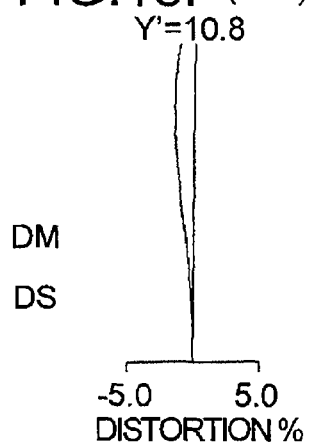
FIG.18F (EX7) Y'=10.8
DISTORTION %
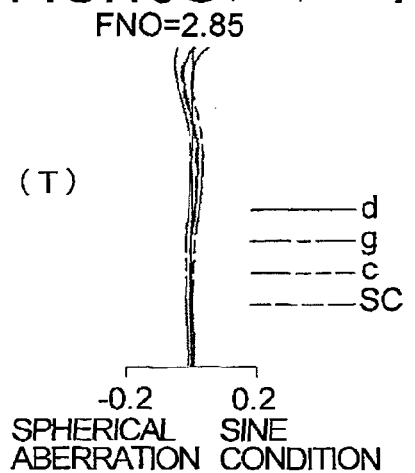
FIG.18G (EX7) FNO=2.85
(T)
d / g / c / SC
SPHERICAL ABERRATION  SINE CONDITION
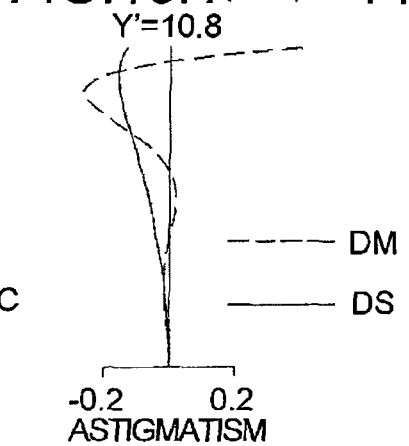
FIG.18H (EX7) Y'=10.8
DM / DS
ASTIGMATISM
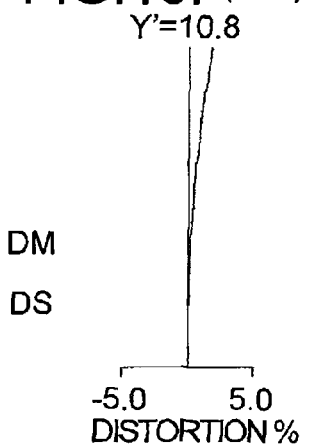
FIG.18I (EX7) Y'=10.8
DISTORTION %

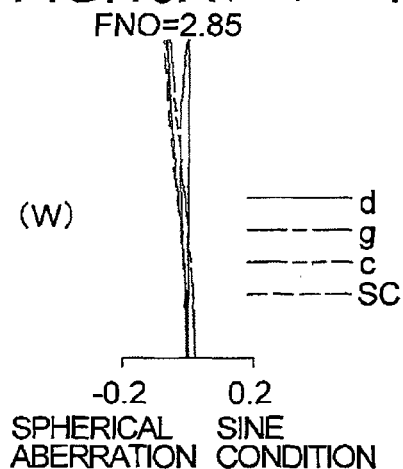
FIG.19A (EX8)
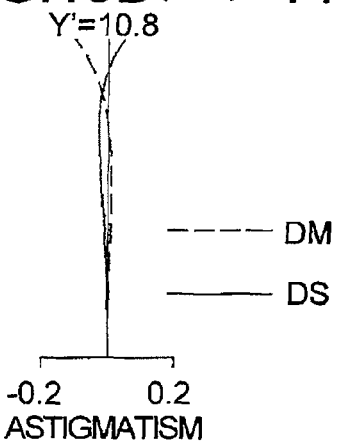
FIG.19B (EX8)
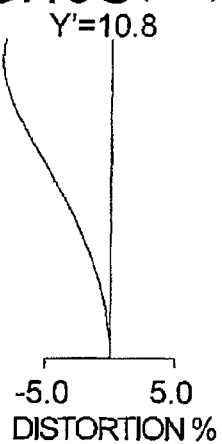
FIG.19C (EX8)
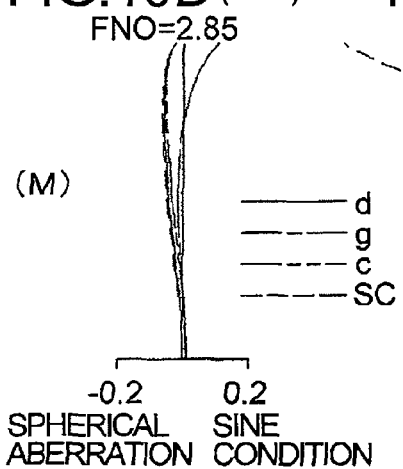
FIG.19D (EX8)
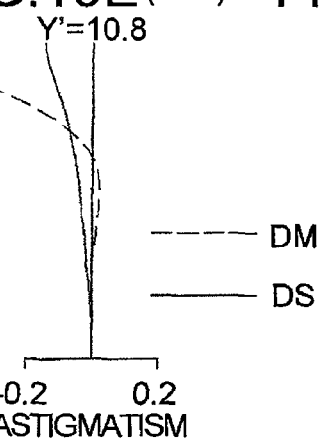
FIG.19E (EX8)
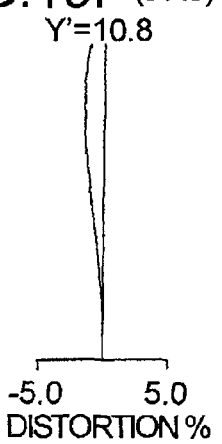
FIG.19F (EX8)
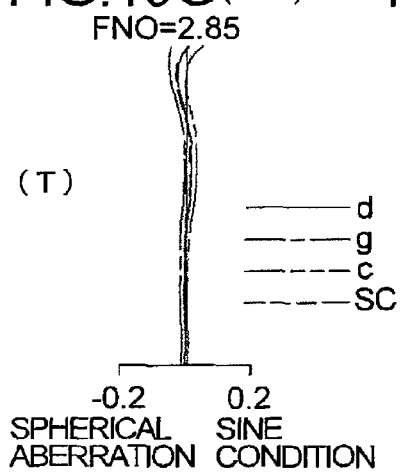
FIG.19G (EX8)
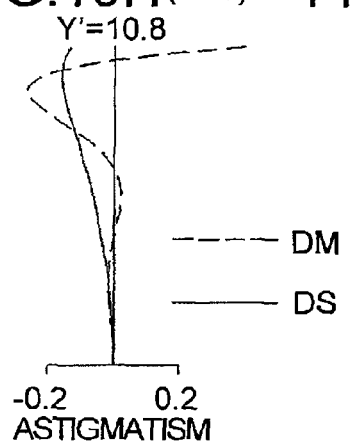
FIG.19H (EX8)
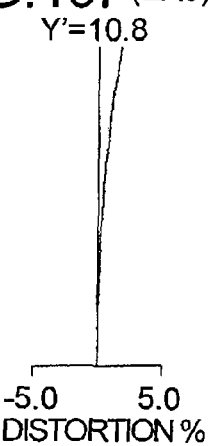
FIG.19I (EX8)

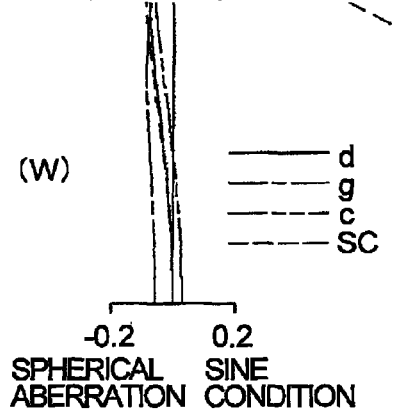
FIG.20A (EX9) FNO=2.85 (W)
SPHERICAL ABERRATION / SINE CONDITION
d, g, c, SC
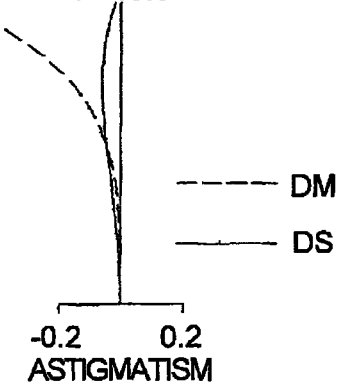
FIG.20B (EX9) Y'=10.8
ASTIGMATISM
DM, DS
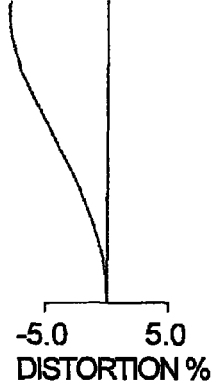
FIG.20C (EX9) Y'=10.8
DISTORTION %
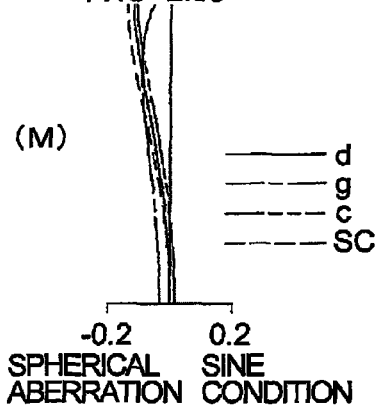
FIG.20D (EX9) FNO=2.85 (M)
SPHERICAL ABERRATION / SINE CONDITION
d, g, c, SC
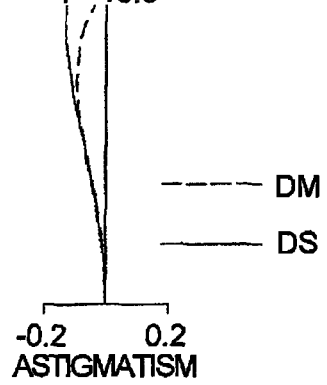
FIG.20E (EX9) Y'=10.8
ASTIGMATISM
DM, DS
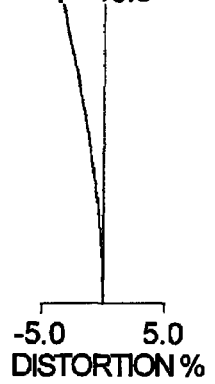
FIG.20F (EX9) Y'=10.8
DISTORTION %
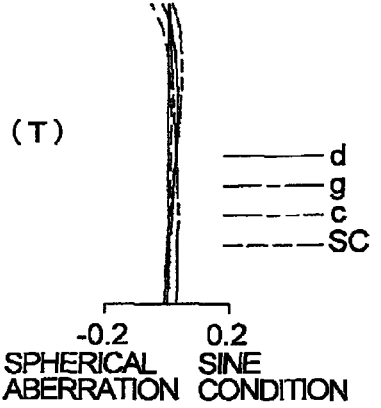
FIG.20G (EX9) FNO=2.85 (T)
SPHERICAL ABERRATION / SINE CONDITION
d, g, c, SC
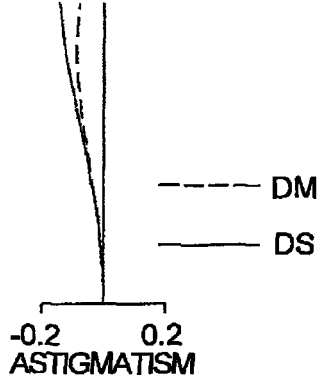
FIG.20H (EX9) Y'=10.8
ASTIGMATISM
DM, DS
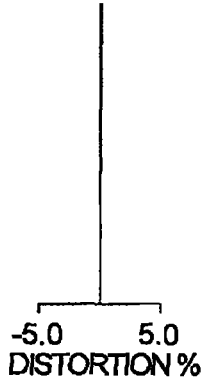
FIG.20I (EX9) Y'=10.8
DISTORTION %

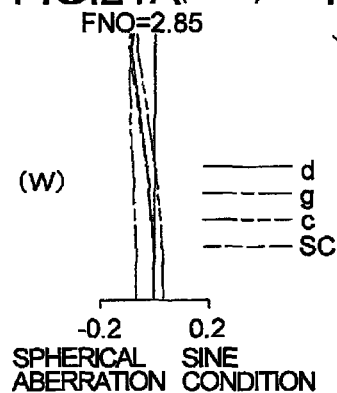
FIG.21A(EX10) FNO=2.85
(W)
d / g / c / SC
-0.2  0.2
SPHERICAL SINE
ABERRATION CONDITION
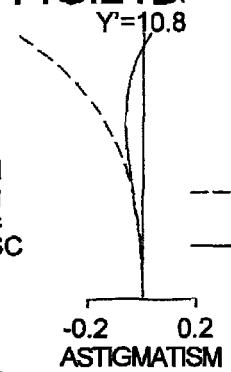
FIG.21B(EX10) Y'=10.8
DM / DS
-0.2  0.2
ASTIGMATISM
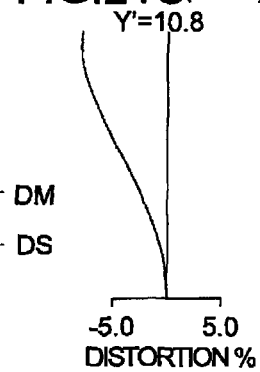
FIG.21C(EX10) Y'=10.8
-5.0  5.0
DISTORTION %
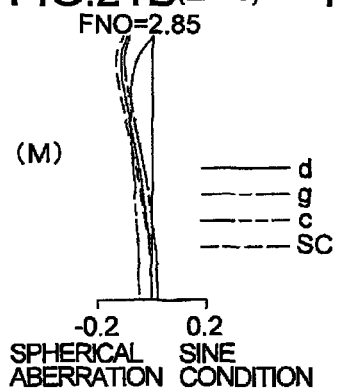
FIG.21D(EX10) FNO=2.85
(M)
d / g / c / SC
-0.2  0.2
SPHERICAL SINE
ABERRATION CONDITION
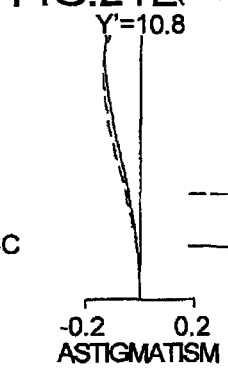
FIG.21E(EX10) Y'=10.8
DM / DS
-0.2  0.2
ASTIGMATISM
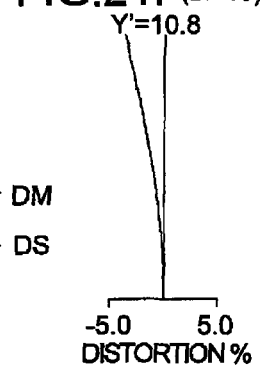
FIG.21F(EX10) Y'=10.8
-5.0  5.0
DISTORTION %
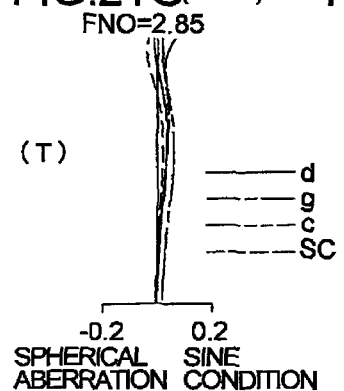
FIG.21G(EX10) FNO=2.85
(T)
d / g / c / SC
-0.2  0.2
SPHERICAL SINE
ABERRATION CONDITION
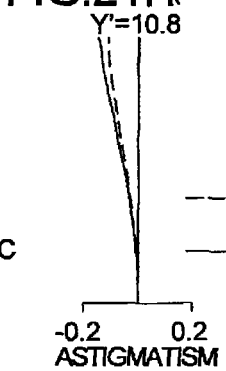
FIG.21H(EX10) Y'=10.8
DM / DS
-0.2  0.2
ASTIGMATISM
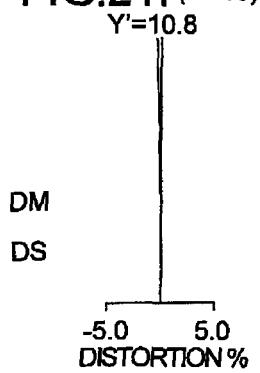
FIG.21I(EX10) Y'=10.8
-5.0  5.0
DISTORTION %

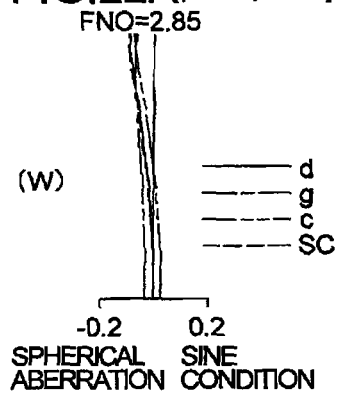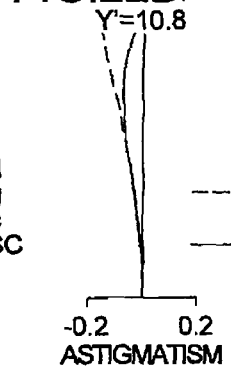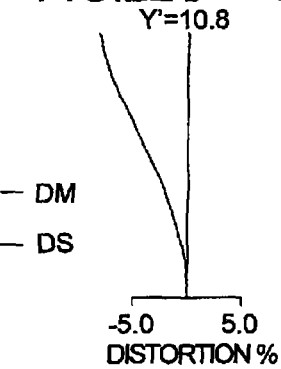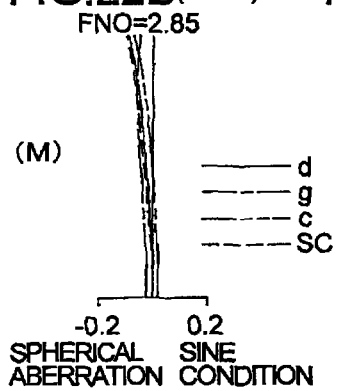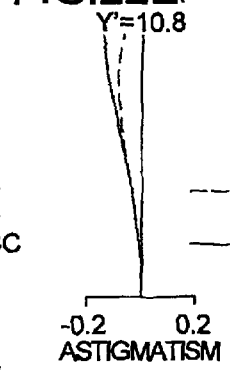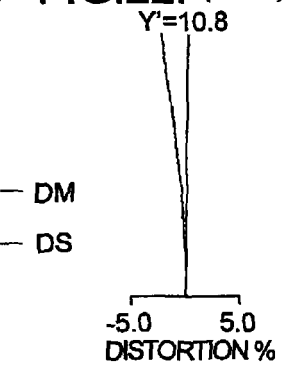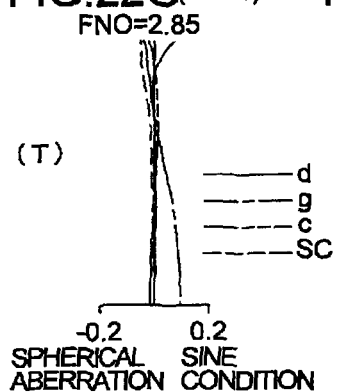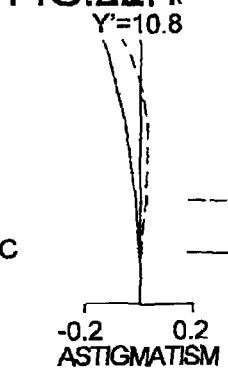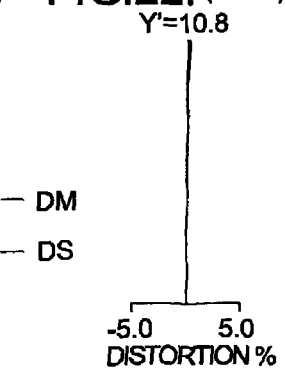

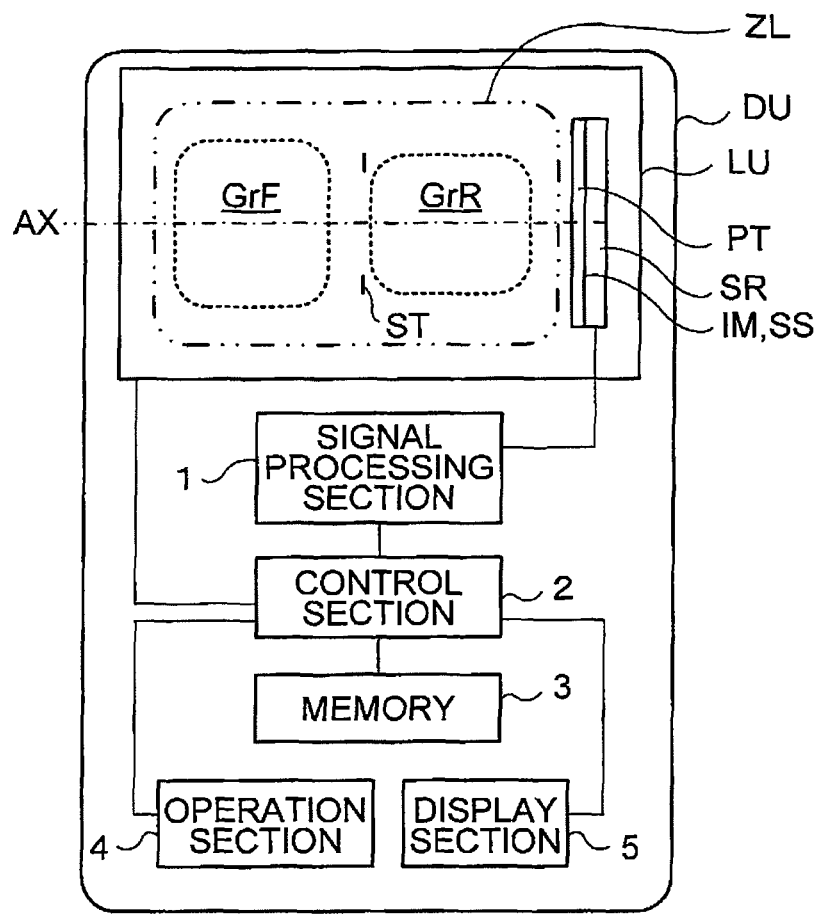

ZOOM LENS, IMAGING OPTICAL DEVICE, AND DIGITAL DEVICE

RELATED APPLICATIONS

This is a U.S. national stage of International application No. PCT/JP 2012/054272 filed on Feb. 22, 2012.

This application claims the priority of Japanese application no. 2011-049799 filed Mar. 8, 2011, the entire content of which is hereby incorporated by reference.)

TECHNICAL FIELD

The present invention relates to zoom lens systems, imaging optical devices, and digital devices. More particularly, the present invention relates to—compact, large-diameter zoom lens systems suitable for digital devices having an image input function, such as digital cameras, that capture an image of a subject by use of an image sensing device (for example, a solid-state image sensing device such as a CCD (charge-coupled device) image sensor or a CMOS (complementary metal-oxide semiconductor) image sensor; imaging optical devices for outputting as an electrical signal the image of the subject captured by such zoom lens systems; and digital devices having an image input function, such as digital cameras, that incorporate such imaging optical devices.

ART BACKGROUND

As positive-led zoom lens systems, lens types are conventionally known in which a negative and a positive optical power are arranged on opposite sides of an aperture stop. For example, the zoom lens system proposed in Patent Document 1 listed below has a three-group—positive-negative-positive—zoom arrangement. There, the negative second group located on the front side of the aperture stop is divided into two negative groups, the distance between which is varied to achieve focusing. The zoom lens system proposed in Patent Document 2 listed below has a four-group—positive-negative-negative-positive—zoom arrangement. There, the part of the fourth group on the front side of the aperture stop serves as a focusing group. The zoom lens system proposed in Patent Document 3 listed below has a four-group—positive-negative-positive-positive—zoom arrangement. There, the positive third group located on the rear side of the aperture stop is divided into a positive and a negative group, and the negative group serves as a camera shake correction group.

LIST OF CITATIONS

Patent Literature

Patent Document 1: Japanese Patent Application Publication No. 2008-122676
Patent Document 2: Japanese Patent Application Publication No. 2009-251118
Patent Document 3: Japanese Patent Application Publication No. 2010-266534

SUMMARY OF THE INVENTION

Technical Problem

Positive-led zoom lens systems as described above are designed for use as interchangeable lenses for cameras provided with a quick-return mirror, and accordingly adopt power arrangements with comparatively long back focuses. This makes it difficult to reduce the optical total length; attempting to obtain a comparatively large diameter of about f/2.8 over the entire zoom range makes it difficult to realize compactness combined with high performance. On the other hand, in mirrorless interchangeable-lens digital cameras, which have no quick-return mirror, it is possible to adopt power arrangements in a range different from that for the conventional types. Thus, a large diameter does not necessarily hinder realizing compactness combined with high performance.

Devised against the background discussed above, the present invention aims to provide a zoom lens system that despite having a large diameter is compact and offers high performance, and to provide an imaging optical device and a digital device provided with such a zoom lens system.

Problem to be Solved by the Invention

To achieve the above object, according to a first invention, a zoom lens system that forms an optical image of an object on a light receiving surface with a diagonal length of 2Ymax of an image sensing device for converting the optical image into an electrical signal, that is composed of, from the object side, a first group having a positive optical power, a second group having a negative optical power, a third group having a negative optical power, an aperture stop, and a plurality of groups having a positive optical power as a whole, and that achieves zooming by varying the distances between the groups fulfills conditional formula (1) below:

$$1.5 < frw/Y\text{max} < 2.1 \tag{1}$$

where, when the plurality of groups located to the image side of the aperture stop are referred to as rear groups,
frw represents the composite focal length of the rear groups; and
Ymax represents the maximum image height.

According to a second invention, the zoom lens system according to the first invention described above achieves focusing by moving the third group.

According to a third invention, the zoom lens system according to the second invention described above fulfills conditional formula (2) below:

$$0.25 < f2/f3 < 0.6 \tag{2}$$

where
f2 represents the focal length of the second group; and
f3 represents the focal length of the third group.

According to a fourth invention, in the zoom lens system according to any one of the first to third inventions described above, the rear groups are composed of, from the object side, a fourth group having a positive optical power and a fifth group having a positive optical power.

According to a fifth invention, the zoom lens system according to the fourth invention described above fulfills conditional formula (3) below:

$$0.6 < f4/f5 < 0.8 \tag{3}$$

where
f4 represents the focal length of the fourth group; and
f5 represents the focal length of the fifth group.

According to a sixth invention, the zoom lens system according to the fourth or fifth invention described above achieves camera shake correction by moving part of the fourth group perpendicularly to the optical axis.

According to a seventh invention, in the zoom lens system according to any one of the first to third inventions described above, the rear groups are composed of, from the object side, a fourth group having a positive optical power, a fifth group having a negative optical power, and a sixth group having a positive optical power.

According to an eighth invention, the zoom lens system according to the seventh invention described above fulfills conditional formula (4) below:

$$0.2 < f4/f6 < 0.7 \quad (4)$$

where f4 represents the focal length of the fourth group; and
f6 represents the focal length of the sixth group.

According to a ninth invention, in the zoom lens system according to the seventh or eighth invention described above, the fourth and sixth groups move as an integral unit during zooming.

According to a tenth invention, the zoom lens system according to any one of the seventh to ninth inventions described above achieves camera shake correction by moving the fifth group perpendicularly to the optical axis.

According to an eleventh invention, the zoom lens system according to any one of the first to tenth inventions described above fulfills conditional formula (5) below:

$$6 < f1/fw < 9 \quad (5)$$

where f1 represents the focal length of the first group; and
fw represents the focal length of the entire system at the wide-angle end.

According to a twelfth invention, the zoom lens system according to any one of the first to eleventh inventions described above fulfills conditional formulae (6) to (8) below:

$$1.1 < \beta 23t/\beta 23w < 1.5 \quad (6)$$

$$1.9 < \beta rt/\beta rw < 2.3 \quad (7)$$

$$1.3 < (\beta 23t/\beta 23w)/(\beta rt/\beta rw) < 1.7 \quad (8)$$

where

β23t represents the composite lateral magnification of the second and third groups at the telephoto end;
β23w represents the composite lateral magnification of the second and third groups at the wide-angle end;
βrt represents the composite lateral magnification of the rear groups at the telephoto end; and
βrw represents the composite lateral magnification of the rear groups at the wide-angle end.

According to a thirteenth invention, the zoom lens system according to any one of the first to twelfth inventions described above has an f number of three or less.

According to a fourteenth invention, the zoom lens system according to any one of the first to thirteenth inventions described above is an interchangeable lens for a digital camera.

According to a fifteenth invention, an imaging optical device is provided with the zoom lens system according to any one of the first to thirteenth inventions described above and an image sensing device for converting an optical image formed on a light receiving surface into an electrical signal. Here, the zoom lens system is arranged such that an optical image of a subject is formed on the light receiving surface of the image sensing device.

According to a sixteenth invention, a digital device is provided with the imaging optical device according to the fifteenth invention described above so as to additionally have at least one of a function of taking a still picture of the subject or a function of taking a moving picture of the subject.

Advantageous Effects of the Invention

According to the present invention, owing to a construction where the composite focal length of the rear groups, which affects the back focus most, is properly set, it is possible to reduce the optical total length, and to achieve, even with a comparatively large diameter of about f/2.8 over the entire zoom range, compactness combined with high performance. Thus, it is possible to realize a zoom lens system and an imaging optical device that despite having a large diameter, with an f number of three or less, is compact and offers high performance. By employing such a large-diameter, compact zoom lens system or imaging optical device in digital devices (for example, digital cameras), it is possible to add a high-performance image input function to the digital devices in a compact fashion.

BRIEF DESCRIPTION OF DRAWINGS

FIGS. 12A to 12I are aberration diagrams of Example 1;
FIGS. 13A to 13I are aberration diagrams of Example 2;
FIGS. 14A to 14I are aberration diagrams of Example 3;
FIGS. 15A to 15I are aberration diagrams of Example 4;
FIGS. 16A to 16I are aberration diagrams of Example 5;
FIGS. 17A to 17I are aberration diagrams of Example 6;
FIGS. 18A to 18I are aberration diagrams of Example 7;
FIGS. 19A to 19I are aberration diagrams of Example 8;
FIGS. 20A to 20I are aberration diagrams of Example 9;
FIGS. 21A to 21I are aberration diagrams of Example 10;
FIGS. 22A to 22I are aberration diagrams of Example 11;
FIG. 23 is a schematic diagram showing an outline of an example of the configuration of a digital device incorporating an imaging optical device.

DESCRIPTION OF EMBODIMENTS

Figure 1:
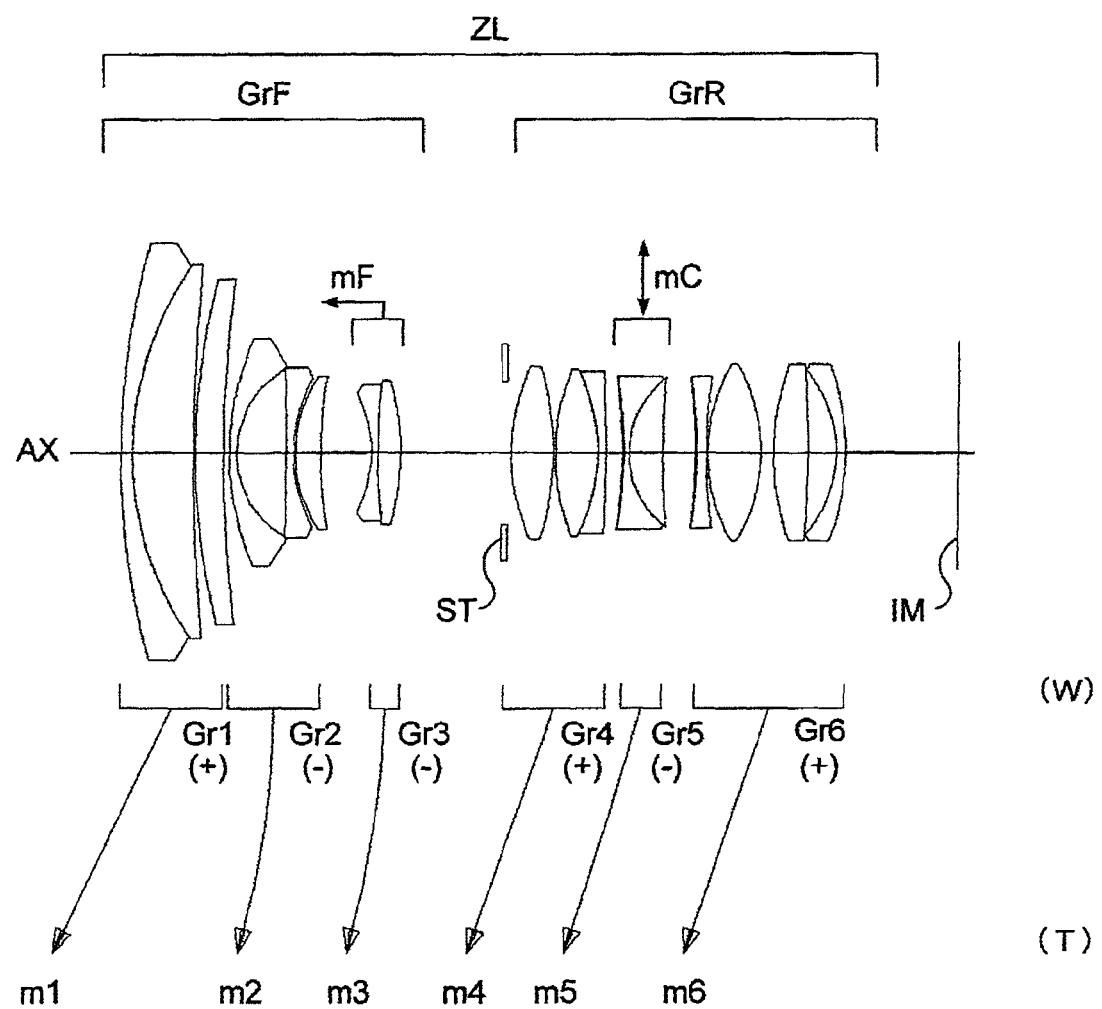
FIG. 1 is a lens construction diagram of a first embodiment (Example 1)

Hereinafter, zoom lens systems, imaging optical devices, and digital devices according to the present invention will be described. A zoom lens system according to the invention is a zoom lens system that forms an optical image of an object on a light receiving surface with a diagonal length of 2Ymax of an image sensing device for converting an optical image into an electrical signal, that is composed of, from the object side, a first group having a positive optical power, a second group having a negative optical power, a third group having a negative optical power, an aperture stop, and a plurality of groups having a positive optical power as a whole, and that achieves zooming by varying the distances between those groups, and fulfills conditional formula (1) below (an optical power being a quantity defined as the reciprocal of a focal length).

$$1.5 < frw/Y\max < 2.1 \tag{1}$$

where, when the plurality of groups located to the image side of the aperture stop are referred to as the rear groups,
 frw represents the composite focal length of the rear groups at the wide-angle end; and
 Ymax represents the maximum image height.

A positive-led zoom lens system according to the invention is of a lens type where, roughly, a negative and a positive optical power are arranged on opposite sides of an aperture stop. With this lens type, shortening the focal length of the rear groups having a positive optical power is effective to size reduction, but doing so simultaneously makes it difficult to secure a sufficient back focus. Thus, this lens type is suitable in interchangeable lenses for cameras whose back focus can be made comparatively short (for example, mirrorless interchangeable-lens digital cameras).

Fulfilling conditional formula (1) above makes it possible to reduce the optical total length, with the result that, even with a comparatively large diameter of about f/2.8 over the entire zoom range, it is possible to achieve compactness combined with high performance. Accordingly, from the standpoint of effectively achieving compactness combined with high performance, it is preferable that the f number be 3 or less. Above the upper limit of conditional formula (1), the focal length of the rear groups having a positive optical power is too long, resulting in a long back focus and hence a large size. Suppressing an increase in size requires a high optical power in the first group, and this makes it difficult to correct spherical aberration. Below the lower limit of conditional formula (1), the focal length of the rear groups having a positive optical power is too short, making it difficult to correct spherical aberration.

With the distinctive construction described above, it is possible to realize a zoom lens system that despite having a large diameter is compact and offers high performance, and to realize an imaging optical device provided with such a zoom lens system. By employing such a zoom lens system or imaging optical device in a digital device such as a digital camera, it is possible to add a high-performance image input function to the digital device in a lightweight, compact fashion. This contributes to making digital devices compact, low-cost, high-performance, versatile, and otherwise improving them. Moreover, a zoom lens system according to the invention is suitable as an interchangeable lens for mirrorless digital cameras from the perspective of reducing the back focus and obtaining a large diameter (for example, keeping f/2.8 over the entire zoom range), and thus makes it possible to realize a compact interchangeable lens that is convenient to carry around. The conditions and other features for obtaining such benefits with a good balance, and for achieving even higher optical performance, further compactness, etc. will be discussed below.

It is preferable that focusing be performed by movement of the third group. It is further preferable that conditional formula (2) below be fulfilled.

$$0.25 < f2/f3 < 0.6 \tag{2}$$

where
 f2 represents the focal length of the second group; and
 f3 represents the focal length of the third group.

With a positive-led interchangeable lens, focusing is generally performed by use of the negative optical power of the second group. However, a negative group produces large variation in lateral magnification, and therefore performing focusing by use of it disadvantageously causes large variation in magnification. By dividing a negative group into a second group having a negative optical power and a third group having a negative optical power and performing focusing by use of the third group having a negative optical power as in the present invention, it is possible to suppress variation in image magnification. A conditional range preferable from that perspective is defined by conditional formula (2). Above the upper limit of conditional formula (2), the negative optical power of the third group is too high, causing large variation in image magnification. Below the lower limit of conditional formula (2), the negative optical power of the third group is too low, disadvantageously resulting in an increased movement amount for focusing.

It is preferable that the rear groups be composed of, from the object side, a fourth group having a positive optical power and a fifth group having a positive optical power. It is further preferable that conditional formula (3) below be fulfilled.

$$0.6 < f4/f5 < 0.8 \tag{3}$$

where
 f4 represents the focal length of the fourth group; and
 f5 represents the focal length of the fifth group.

To achieve a large diameter of about f/2.8 over the range from the wide-angle end to the telephoto end, it is necessary to more accurately correct aberrations with respect to depth of focus. Of particular importance in aberration correction is correction of curvature of field; it is necessary to restrict within a certain range the balance of curvature of field between wide-angle and telephoto sides. For example, in Examples 6 to 8 presented later, the rear groups GrR located to the image side of the aperture stop ST are composed of a fourth group Gr4 having a positive optical power and a fifth group Gr5 having a positive optical power, and the fourth and fifth groups Gr4 and Gr5 are configured to move independently during zooming.

As for the distance sensitivity of the fourth and fifth groups, curvature of field is highly sensitive, and this makes it possible to correct curvature of field satisfactorily over the range from the wide-angle end to the telephoto end. A conditional range preferable from that perspective is defined by conditional formula (3). Above the upper limit of conditional formula (3), the optical power of the fifth group is too high, making it difficult to correct the spherical aberration occurring within the fifth group. Below the lower limit of conditional formula (3), the optical power of the fourth group is too high, making it difficult to correct variation in the curvature of field occurring in the fourth group.

It is preferable to correct camera shake by moving part of the fourth group perpendicularly to the optical axis. For example, in Examples 6 to 8 presented later, camera shake is corrected by moving an image-side doublet lens element in the fourth group perpendicularly to the optical axis. From the perspective of sensitivity, it is preferable to use, in this way, a doublet lens element included in an image-side part of the fourth group as a camera shake correcting group, and it is further preferable that the doublet lens element have an aspherical surface.

It is preferable that the rear groups be composed of, from the object side, a fourth group having a positive optical power, a fifth group having a negative optical power, and a sixth group having a positive optical power. It is further preferable that conditional formula (4) below be fulfilled. It is further preferable that the fourth and sixth groups move as an integral unit during zooming.

$$0.2 < f4/f6 < 0.7 \qquad (4)$$

where
f4 represents the focal length of the fourth group; and
f6 represents the focal length of the sixth group.

To achieve a large diameter of about f/2.8 over the range from the wide-angle end to the telephoto end, it is necessary to more accurately correct aberrations with respect to depth of focus. Of particular importance in aberration correction is correction of curvature of field; it is necessary to restrict within a certain range the balance of curvature of field between wide-angle and telephoto sides. For example, in Examples 1 to 5 and 9 to 11 presented later, the rear groups GrR located to the image side of the aperture stop ST are composed of a fourth group Gr4 having a positive optical power, a fifth group Gr5 having a negative optical power, and a sixth group Gr6 having a positive optical power, and during zooming, the fourth and sixth groups Gr4 and Gr6 move as an integral unit, and the fifth group Gr5 moves independently of them.

The fourth and sixth groups are highly sensitive to eccentric errors, and therefore, from the standpoint of manufacture, it is preferable to adopt a construction where the fourth and sixth groups move as an integral unit during zooming. Moreover, as for the distance sensitivity of the fourth and fifth groups, curvature of field is highly sensitive, and this makes it possible to correct curvature of field satisfactorily over the range from the wide-angle end to the telephoto end. A conditional range preferable from that perspective is defined by conditional formula (4). Above the upper limit of conditional formula (4), the optical power of the sixth group is too high, making it difficult to correct the spherical aberration occurring within the sixth group. Below the lower limit of conditional formula (4), the optical power of the fourth group is too high, making it difficult to correct variation in the curvature of field occurring in the fourth group.

It is preferable to correct camera shake by moving the fifth group perpendicularly to the optical axis. For example, in Examples 1-5 and 9-11 presented later, camera shake is corrected by moving the fifth group, which is composed of a doublet lens element, perpendicularly to the optical axis. From the perspective of sensitivity, it is preferable to use, in this way, the fifth group composed of a doublet lens element as a camera shake correcting group, and it is further preferable that the doublet lens element have an aspherical surface.

It is preferable that conditional formula (5) below be fulfilled.

$$6 < f1/fw < 9 \qquad (5)$$

where
f1 represents the focal length of the first group; and
fw represents the focal length of the entire system at the wide-angle end.

Conditional formula (5) defines a preferable conditional range with respect to the positive optical power of the first group. Above the upper limit of conditional formula (5), the optical power of the first group is too low, which may result in an increased size. Suppressing an increase in size requires a high optical power in the third group, making it difficult to correct curvature of field. Below the lower limit of conditional formula (5), the optical power of the first group is too high, making it difficult to correct the spherical aberration occurring within the first group.

It is preferable that conditional formulae (6) to (8) below be fulfilled.

$$1.1 < \beta 23t/\beta 23w < 1.5 \qquad (6)$$

$$1.9 < \beta rt/\beta rw < 2.3 \qquad (7)$$

$$1.3 < (\beta 23t/\beta 23w)/(\beta rt/\beta rw) < 1.7 \qquad (8)$$

where
β23t represents the composite lateral magnification of the second and third groups at the telephoto end;
β23w represents the composite lateral magnification of the second and third groups at the wide-angle end;
βrt represents the composite lateral magnification of the rear groups at the telephoto end; and
βrw represents the composite lateral magnification of the rear groups at the wide-angle end.

With a positive-led zoom lens system, generally, the burden of zooming is chiefly borne by the negative optical power of the second group, while the third group takes a comparatively little part in zooming. Under conditions set according to formulae (6) to (8) above, by increasing the optical power of the rear groups located to the image side of the aperture stop and thereby increasing the burden of zooming borne by the rear groups, it is possible to achieve compactness combined with satisfactory optical performance.

Conditional formula (6) defines a preferable conditional range with respect to the ratio of the composite lateral magnification of the second and third groups at the wide-angle and telephoto ends. Above the upper limit of conditional formula (6), the burden of zooming on the negative group is too heavy, making it difficult to correct the astigmatism occurring in the negative group. Below the lower limit of conditional formula (6), the burden of zooming on the rear groups located to the image side of the aperture stop is too heavy, making it difficult to correct the spherical aberration occurring in the rear groups.

Conditional formula (7) defines a preferable conditional range with respect to the ratio of the lateral magnification of the rear groups between the wide-angle end and the telephoto end. Above the upper limit of conditional formula (7), the burden of zooming on the rear groups located to the image side of the aperture stop is too heavy, making it difficult to correct the spherical aberration occurring in the rear groups. Below the lower limit of conditional formula (7), the burden of zooming on the negative group is too heavy, making it difficult to correct the coma aberration occurring in the negative group.

Conditional formula (8) defines a preferable conditional range for the ratio of the burden of zooming between the negative group and the rear groups. Above the upper limit of conditional formula (8), the burden of zooming on the negative group is too heavy, making it difficult to correct the coma aberration occurring in the negative group. Below the lower limit of conditional formula (8), the burden of zooming on the rear groups is too heavy, making it difficult to correct the spherical aberration occurring in the rear groups.

A zoom lens system according to the invention is suitable as an imaging lens system for a digital device having an image input function (such as a digital camera), and by combining it with an image sensing device or the like, it is possible to build an imaging optical device that captures an image of a subject optically and outputs it as an electrical signal. An imaging optical device is an optical device that constitutes a main component of a camera used to take a still or moving picture of a subject, and is composed of, for example, from the object side (that is, from the subject side), a zoom lens system which forms an optical image of an object and an image sensing device which converts the optical image formed by the zoom lens system into an electrical signal. By arranging the zoom lens system having the distinctive construction described above in such a way that the optical image of the subject is formed on the light receiving surface (that is, the imaging surface) of the image sensing device, it is possible to realize a compact, low-cost, high-zoom-ratio, high-performance imaging optical device and a digital device (for example, a digital camera or a cellular phone) provided with it.

Examples of cameras include digital cameras, video cameras, surveillance cameras, vehicle-mounted cameras, and videophone cameras; and cameras incorporated in, or externally attached to, personal computers, digital devices (for example, compact, portable information device terminals such as cellular phones and mobile computers), peripheral devices for those (for example scanners and printers), and other digital devices. As these examples show, it is possible not only to build a camera by use of an imaging optical device, but also to add a camera function to various devices by incorporating an imaging optical device in them. For example, it is possible to build a digital device having an image input function, such as a camera-equipped cellular phone.

FIG. 23 shows, in a schematic sectional view, an outline of an example of the configuration of a digital device DU having an image input function. The digital device DU shown in FIG. 23 incorporates an imaging optical device LU, which is provided with, from the object side (that is, from the subject side), a zoom lens system ZL (AX representing the optical axis, ST representing the aperture stop) which forms an optical image (image plane) IM of an object in a zoomable fashion, a plane-parallel plate PT (corresponding to the cover glass of an image sensing device SR and, where applicable, an optical filter or the like provided as necessary, such as an optical low-pass filter, an infrared cut filter, etc.), and an image sensing device SR which converts the optical image IM formed on the light receiving surface SS by the zoom lens system ZL into an electrical signal. When this imaging optical device LU is used to build a digital device DU having an image input function, the former is generally arranged inside the body of the latter. When a camera function is realized, a construction that suits the needs may be adopted. For example, an imaging optical device LU built as a unit may be configured to be detachably attached to, or rotatable about the body of the digital device DU.

Used as the image sensing device SR is a solid-state image sensing device having a plurality of pixels, such as a CCD image sensor or a CMOS image sensor. Since the zoom lens system ZL is arranged in such a way that the optical image IM of the subject is formed on the light receiving surface SS, which is the photoelectric conversion portion of the image sensing device SR, the optical image IM formed by the zoom lens system ZL is converted into an electrical signal by the image sensing device SR.

The digital device DU is provided with, in addition to the imaging optical device LU, a signal processing section 1, a control section 2, a memory 3, an operation section 4, a display section 5, etc. The signal generated by the image sensing device SR is subjected to predetermined digital image processing, image compression processing, etc. as necessary in the signal processing section 1, and the resulting digital video signal is recorded to the memory 3 (a semiconductor memory, an optical disc, or the like) and, as the case may be, transferred to an external device (for example, the communication function of a cellular phone) via a cable or after being converted into an infrared signal or the like. The control section 2 comprises a microcomputer, and performs in a concentrated fashion the control of picture taking functions (such as a function of taking still pictures and a function of taking moving pictures), the control of functions such as an image playback function, the control of lens movement mechanisms for zooming, focusing, camera shake correction, etc., and other control. For example, the control section 2 controls the imaging optical device LU so as to perform at least either the taking of a still picture of a subject or the taking of a moving picture of a subject. The display section 5 is a section that includes a display such as a liquid crystal monitor, and performs image display by use of an image signal resulting from conversion by the image sensing device SR or image information recorded on the memory 3. The operation section 4 is a section that includes operation buttons (for example, a shutter release button) and operation dials (for example, a picture taking mode dial), and conveys the information entered through the user's operation to the control section 2.

The zoom lens system ZL has a large-diameter, positive-led zoom construction composed of, from the object side, front groups GrF located to the object side of an aperture stop ST, the aperture stop ST, and rear groups GrR located between the aperture stop ST and the image plane IM. The front groups GrF are composed of three groups, positive, negative, and negative respectively, which have a negative optical power (or a weak positive optical power) as a whole. The rear groups GrR are composed of a plurality of groups which have a positive optical power as a whole. As those groups move along the optical axis AX, the distances between the groups vary, and thereby zooming (that is, magnification variation) is achieved; meanwhile, the optical image IM is formed on the light receiving surface SS of the image sensing device SR.

Figure 2:
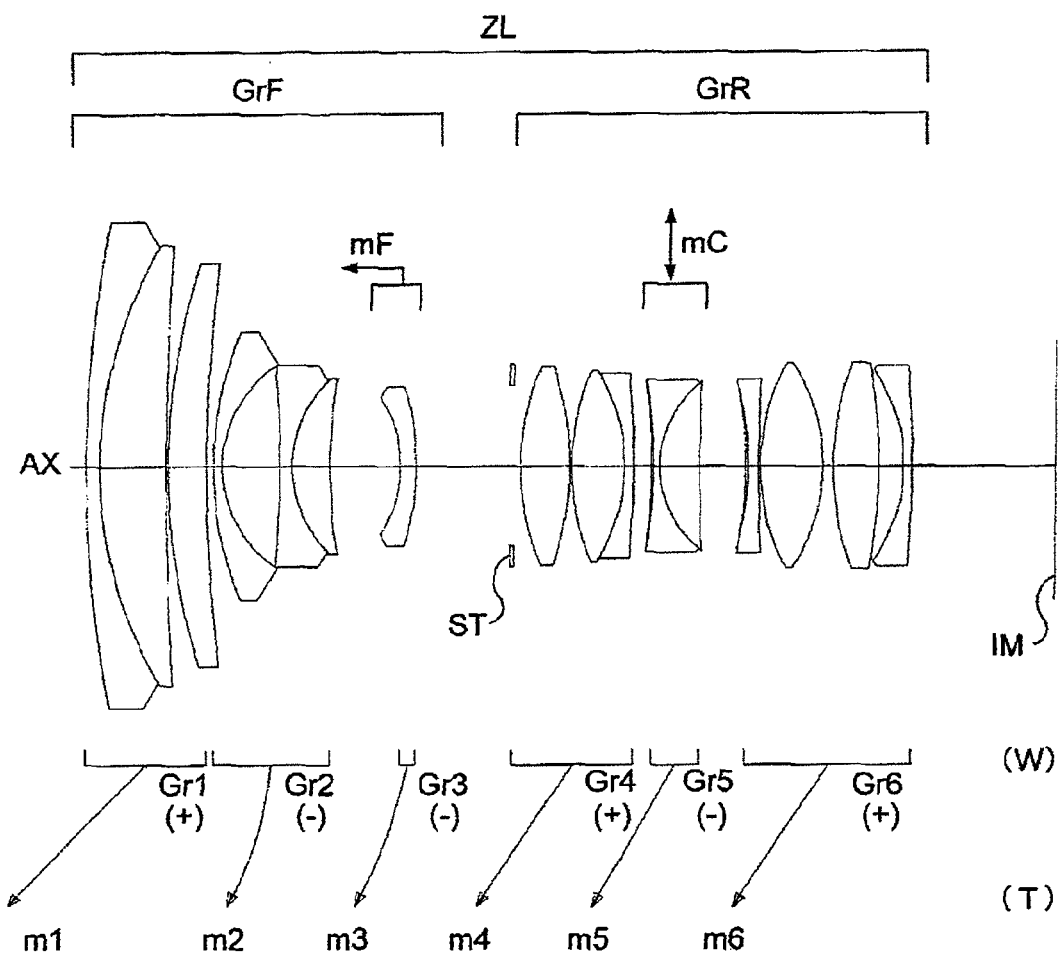
FIG. 2 is a lens construction diagram of a second embodiment (Example 2)
Figure 3:
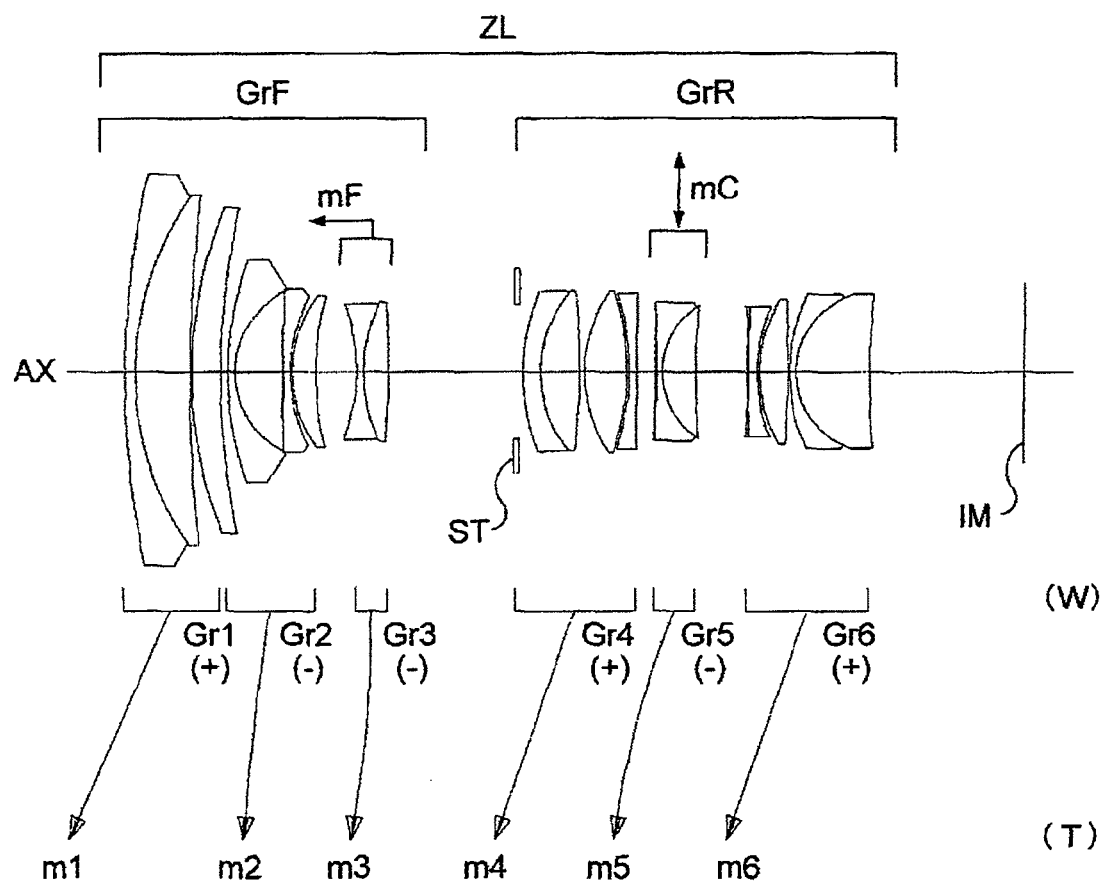
FIG. 3 is a lens construction diagram of a third embodiment (Example 3)
Figure 4:
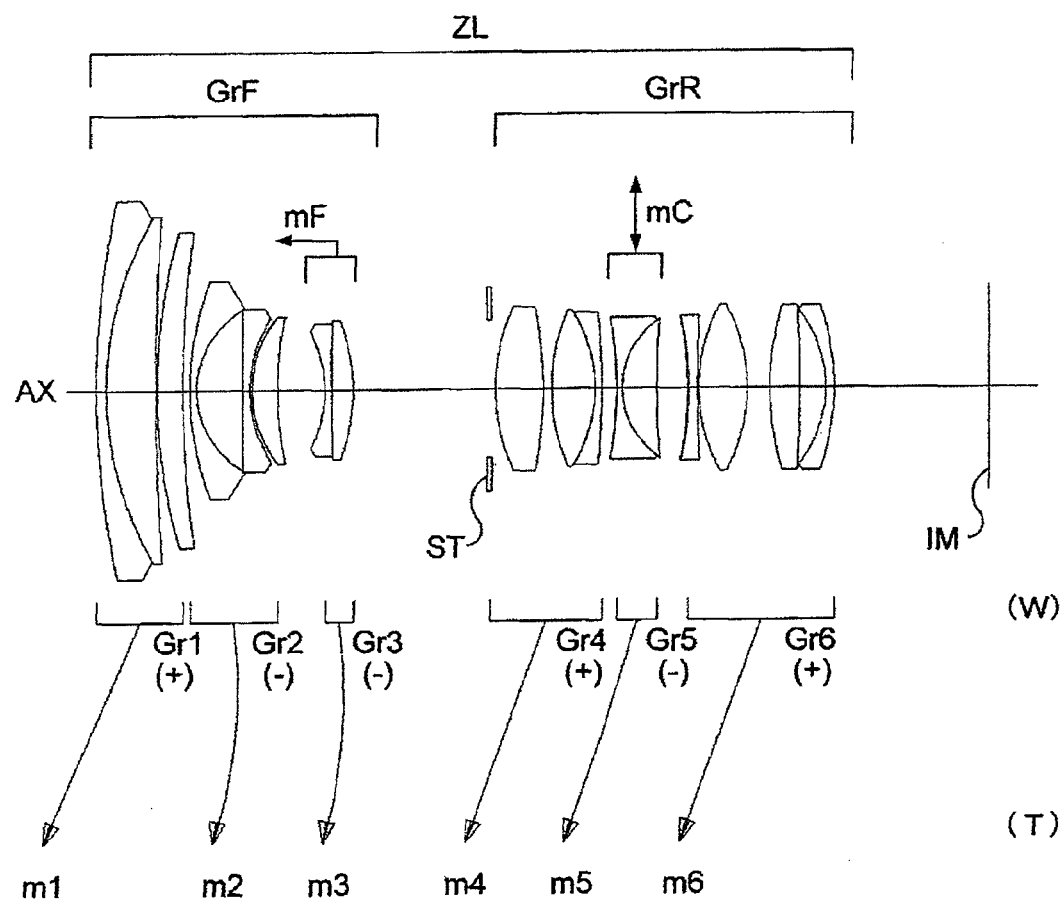
FIG. 4 is a lens construction diagram of a fourth embodiment (Example 4)
Figure 5:
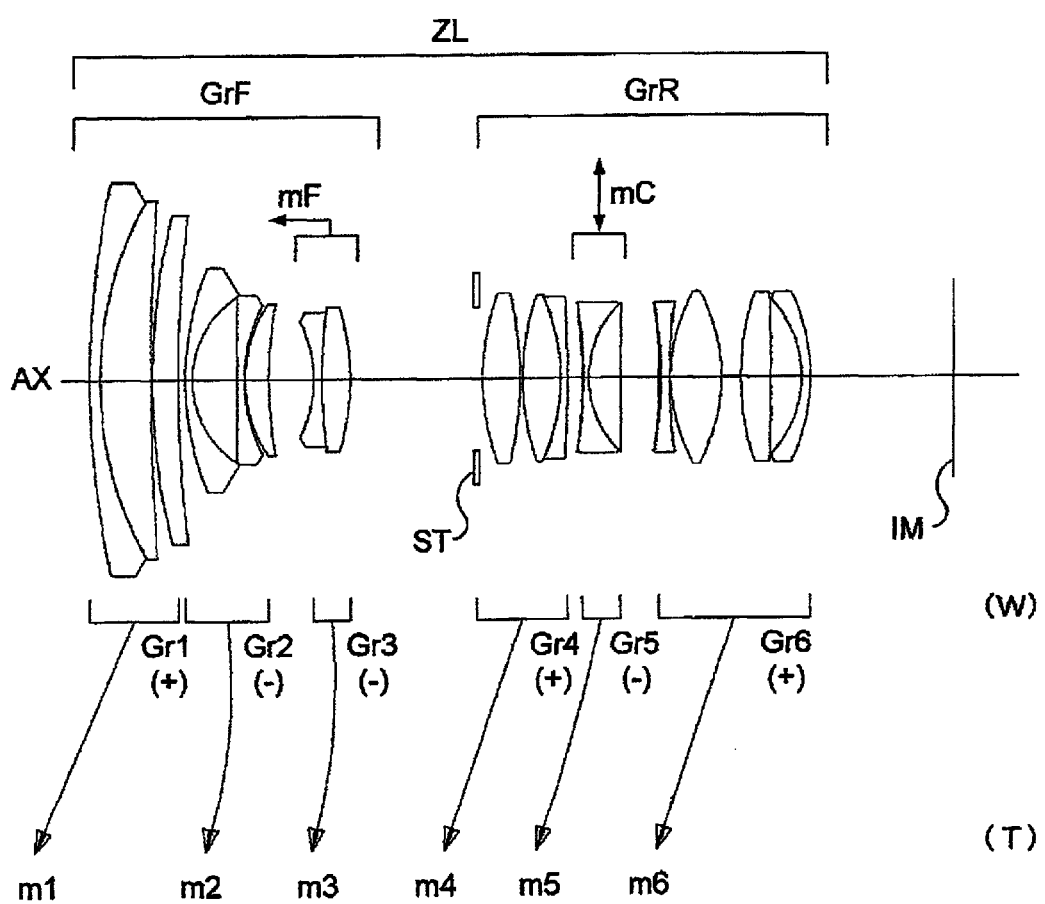
FIG. 5 is a lens construction diagram of a fifth embodiment (Example 5)
Figure 6:
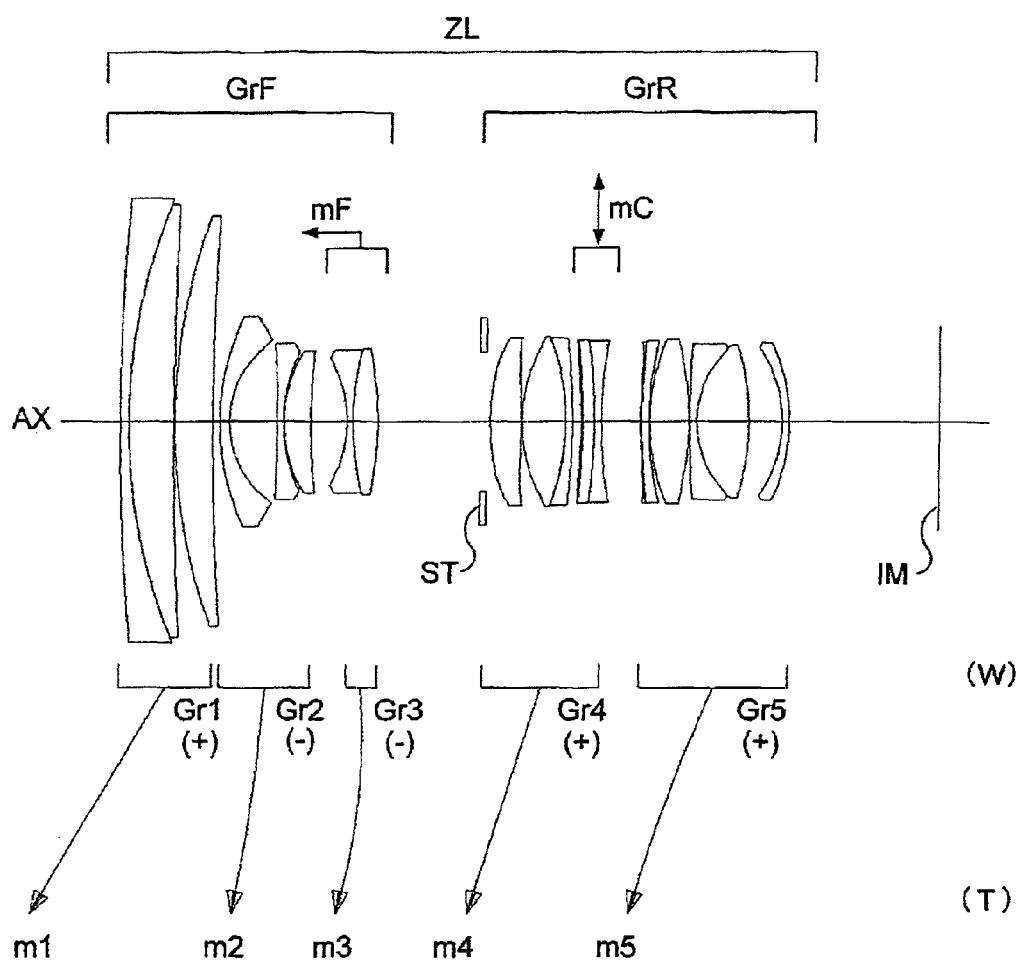
FIG. 6 is a lens construction diagram of a sixth embodiment (Example 6)
Figure 7:
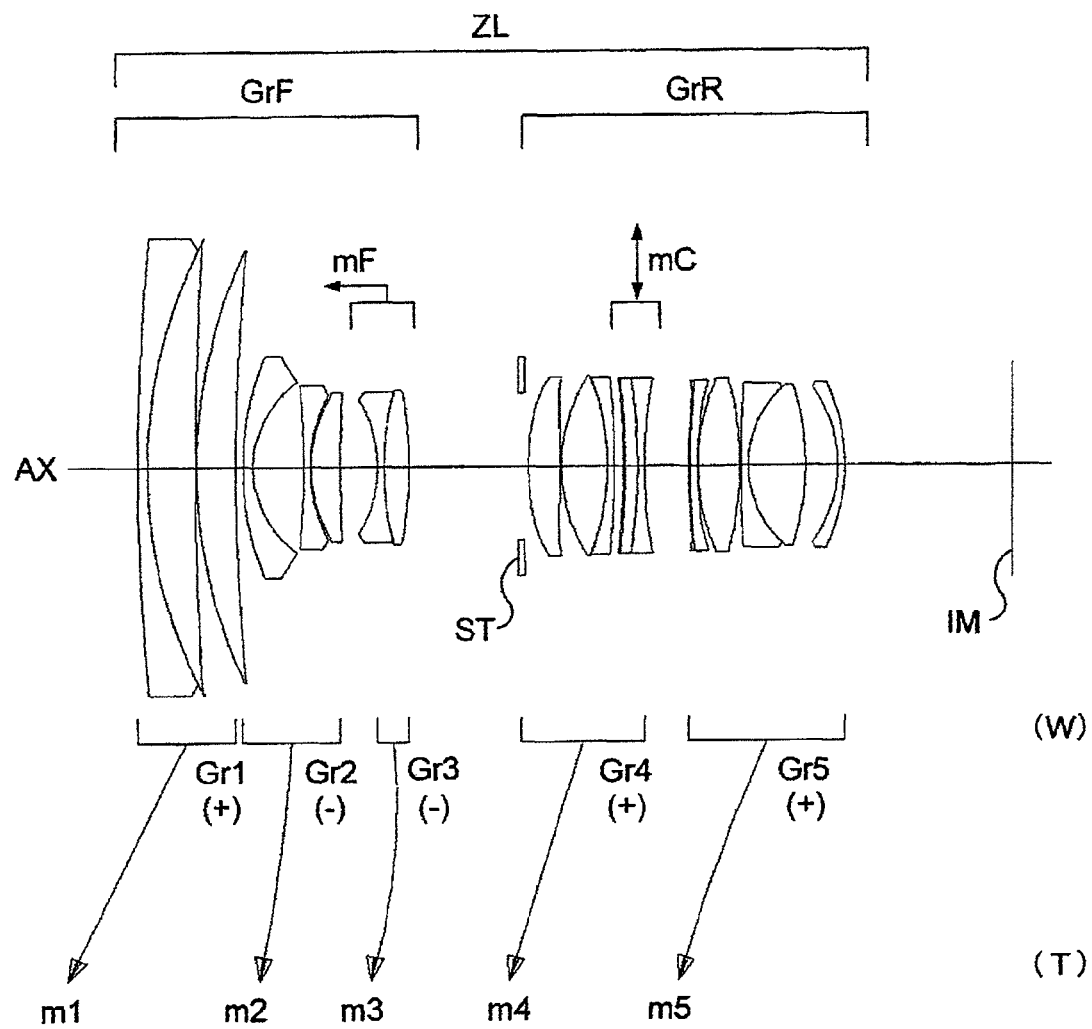
FIG. 7 is a lens construction diagram of a seventh embodiment (Example 7)
Figure 8:
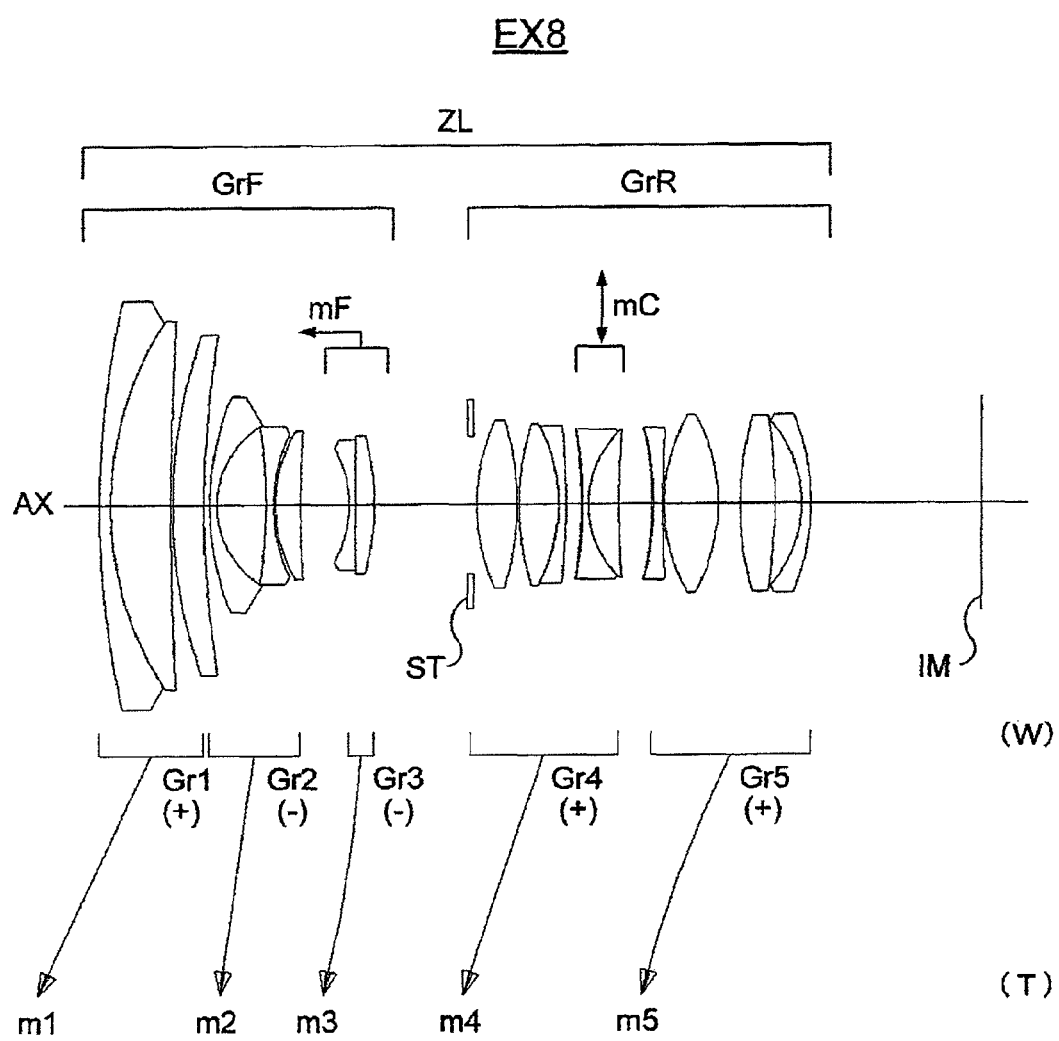
FIG. 8 is a lens construction diagram of an eighth embodiment (Example 8)
Figure 9:
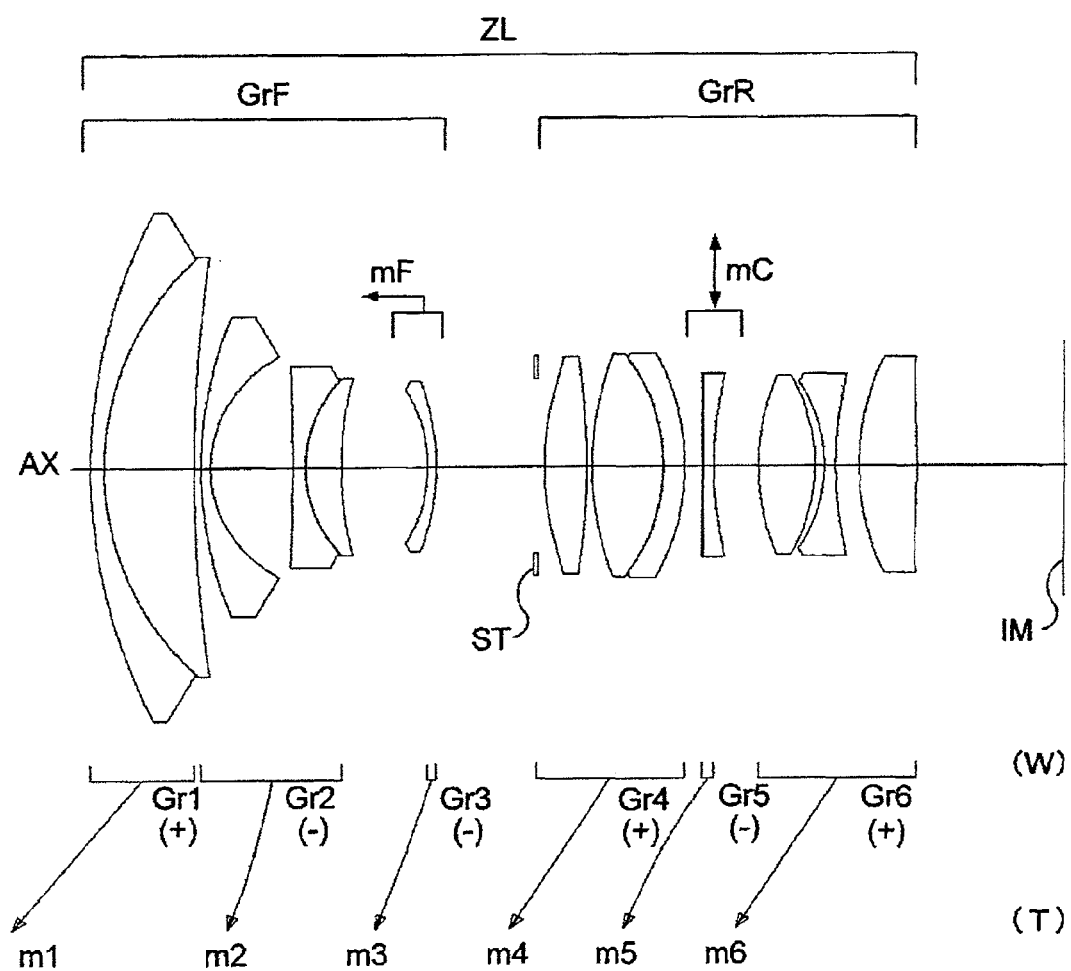
FIG. 9 is a lens construction diagram of a ninth embodiment (Example 9)
Figure 10:
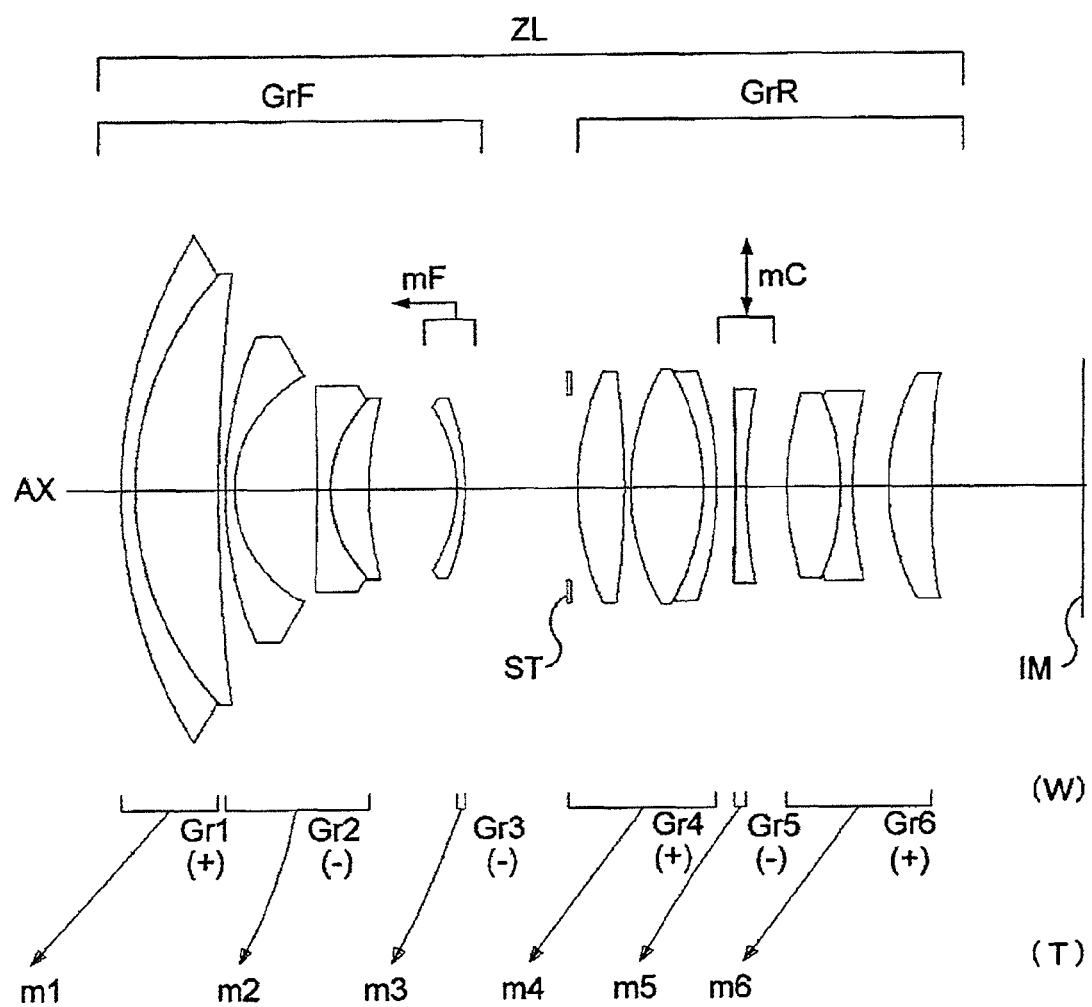
FIG. 10 is a lens construction diagram of a tenth embodiment (Example 10)
Figure 11:
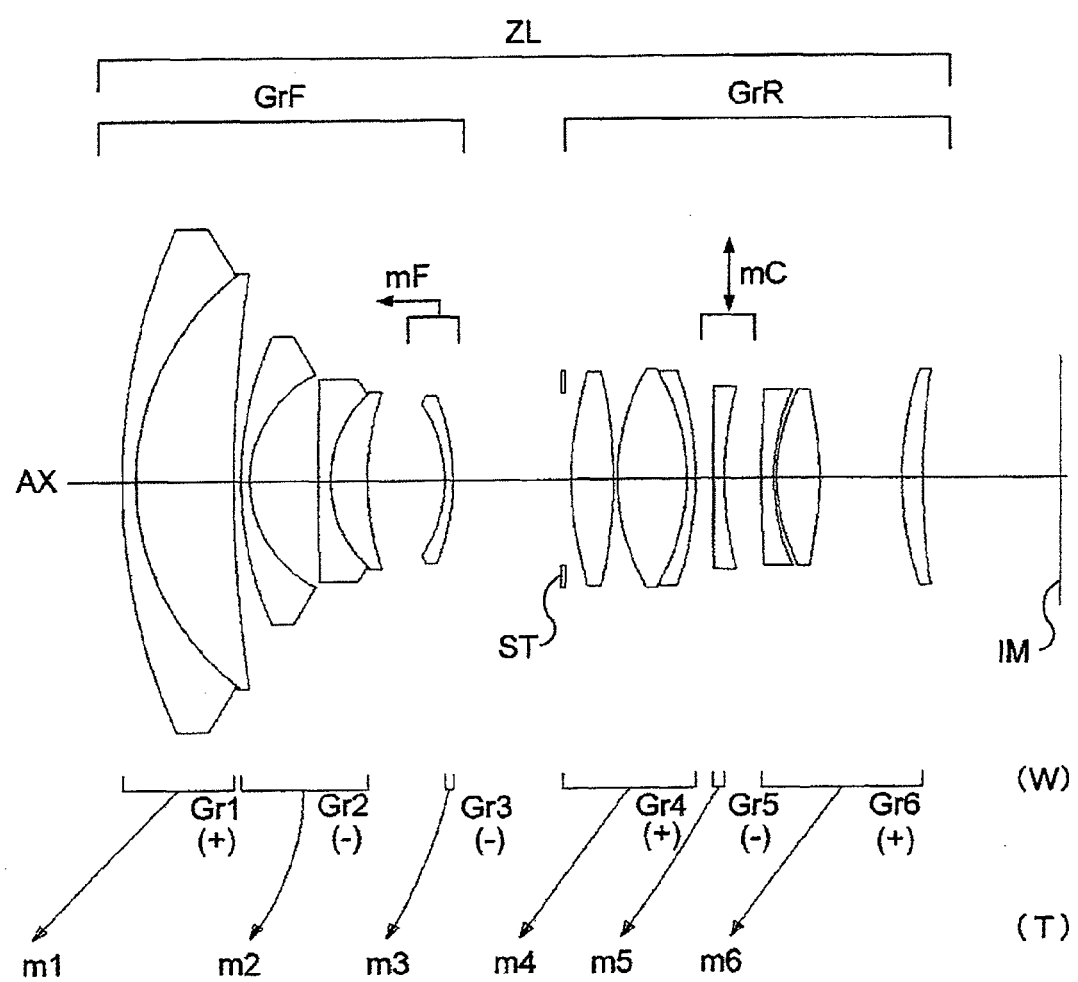
FIG. 11 is a lens construction diagram of an eleventh embodiment (Example 11)

Hereinafter, by way of a first to an eleventh embodiment of the present invention, specific optical constructions of the zoom lens system ZL will be described in more detail. FIGS. 1 to 11 are lens construction diagrams corresponding to the zoom lens system ZL in the first to eleventh embodiments respectively, each showing the lens arrangement at the wide-angle end (W) in an optical section. In the lens construction diagrams, arrows m1, m2, m3, m4, m5, and m6 schematically show the movement of the first group Gr1, the second group Gr2, the third group Gr3, the fourth group Gr4, the fifth group Gr5, and the sixth group Gr6, respectively, during zooming from the wide-angle end (W) to the telephoto end (T).

In the first embodiment (FIG. 1), the front groups GrF are composed of three groups, positive, negative, and negative respectively, and the rear groups GrR are composed of three groups, positive, negative, and positive respectively. During zooming, all the groups Gr1 to Gr6 move individually. Notably, the fourth and sixth groups Gr4 and Gr6 move as an integral unit during zooming, and the fifth group Gr5 moves independently of them. The third group Gr3 is a focusing group, and is, as indicated by arrow mF, moved out toward the object side during focusing on a close-distance object. An aperture stop ST is located to the object side of the fourth group Gr4, and moves together with the fourth group Gr4 during zooming. A doublet lens element constituting the fifth group Gr5 constitutes a camera shake correcting group, and by moving the camera shake correcting group perpendicularly to the optical axis AX as indicated by arrow mC, camera shake correction is achieved. Aspherical surfaces are both surfaces of the most object-side lens element in the fourth group Gr4, the most object-side surface in the fifth group Gr5, and the most object-side surface in the sixth group Gr6.

In the second embodiment (FIG. 2), the front groups GrF are composed of three groups, positive, negative, and negative respectively, and the rear groups GrR are composed of three groups, positive, negative, and positive respectively. During zooming, all the groups Gr1 to Gr6 move individually. Notably, the fourth and sixth groups Gr4 and Gr6 move as an integral unit during zooming, and the fifth group Gr5 moves independently of them. The third group Gr3 is a focusing group, and is, as indicated by arrow mF, moved out toward the object side during focusing on a close-distance object. An aperture stop ST is located to the object side of the fourth group Gr4, and moves together with the fourth group Gr4 during zooming. A doublet lens element constituting the fifth group Gr5 constitutes a camera shake correcting group, and by moving the camera shake correcting group perpendicularly to the optical axis AX as indicated by arrow mC, camera shake correction is achieved. Aspherical surfaces are both surfaces of the most object-side lens element in the fourth group Gr4, the most object-side surface in the fifth group Gr5, and the most object-side surface in the sixth group Gr6.

In the third embodiment (FIG. 3), the front groups GrF are composed of three groups, positive, negative, and negative respectively, and the rear groups GrR are composed of three groups, positive, negative, and positive respectively. During zooming, all the groups Gr1 to Gr6 move individually. Notably, the fourth and sixth groups Gr4 and Gr6 move as an integral unit during zooming, and the fifth group Gr5 moves independently of them. The third group Gr3 is a focusing group, and is, as indicated by arrow mF, moved out toward the object side during focusing on a close-distance object. An aperture stop ST is located to the object side of the fourth group Gr4, and moves together with the fourth group Gr4 during zooming. A doublet lens element constituting the fifth group Gr5 constitutes a camera shake correcting group, and by moving the camera shake correcting group perpendicularly to the optical axis AX as indicated by arrow mC, camera shake correction is achieved. Aspherical surfaces are the most image-side surface in the third group Gr3, the most object-side surface in the fifth group Gr5, and the most object-side surface in the sixth group Gr6.

In the fourth embodiment (FIG. 4), the front groups GrF are composed of three groups, positive, negative, and negative respectively, and the rear groups GrR are composed of three groups, positive, negative, and positive respectively. During zooming, all the groups Gr1 to Gr6 move individually. Notably, the fourth and sixth groups Gr4 and Gr6 move as an integral unit during zooming, and the fifth group Gr5 moves independently of them. The third group Gr3 is a focusing group, and is, as indicated by arrow mF, moved out toward the object side during focusing on a close-distance object. An aperture stop ST is located to the object side of the fourth group Gr4, and moves together with the fourth group Gr4 during zooming. A doublet lens element constituting the fifth group Gr5 constitutes a camera shake correcting group, and by moving the camera shake correcting group perpendicularly to the optical axis AX as indicated by arrow mC, camera shake correction is achieved. Aspherical surfaces are the most image-side surface in the third group Gr3, the most object-side surface in the fifth group Gr5, and the most object-side surface in the sixth group Gr6.

In the fifth embodiment (FIG. 5), the front groups GrF are composed of three groups, positive, negative, and negative respectively, and the rear groups GrR are composed of three groups, positive, negative, and positive respectively. During zooming, all the groups Gr1 to Gr6 move individually. Notably, the fourth and sixth groups Gr4 and Gr6 move as an integral unit during zooming, and the fifth group Gr5 moves independently of them. The third group Gr3 is a focusing group, and is, as indicated by arrow mF, moved out toward the object side during focusing on a close-distance object. An aperture stop ST is located to the object side of the fourth group Gr4, and moves together with the fourth group Gr4 during zooming. A doublet lens element constituting the fifth group Gr5 constitutes a camera shake correcting group, and by moving the camera shake correcting group perpendicularly to the optical axis AX as indicated by arrow mC, camera shake correction is achieved. Aspherical surfaces are the most object-side surface in the fourth group Gr4, the most object-side surface in the fifth group Gr5, and the most object-side surface in the sixth group Gr6.

In the sixth embodiment (FIG. 6), the front groups GrF are composed of three groups, positive, negative, and negative respectively, and the rear groups GrR are composed of two groups, positive and positive respectively. During zooming, all the groups Gr1 to Gr5 move individually. The third group Gr3 is a focusing group, and is, as indicated by arrow mF, moved out toward the object side during focusing on a close-distance object. An aperture stop ST is located to the object side of the fourth group Gr4, and moves together with the fourth group Gr4 during zooming. A most image-side doublet lens element constituting the fourth group Gr4 constitutes a camera shake correcting group, and by moving the camera shake correcting group perpendicularly to the optical axis AX as indicated by arrow mC, camera shake correction is achieved. Aspherical surfaces are both surfaces of the most object-side lens element in the fourth group Gr4, the object-side surface of the image-side doublet lens element in the fourth group Gr4, and the most object-side surface in the fifth group Gr5.

In the seventh embodiment (FIG. 7), the front groups GrF are composed of three groups, positive, negative, and negative respectively, and the rear groups GrR are composed of two groups, positive and positive respectively. During zooming, all the groups Gr1 to Gr5 move individually. The third group Gr3 is a focusing group, and is, as indicated by arrow mF, moved out toward the object side during focusing on a close-distance object. An aperture stop ST is located to the object side of the fourth group Gr4, and moves together with the fourth group Gr4 during zooming. A most image-side doublet lens element constituting the fourth group Gr4 constitutes a camera shake correcting group, and by moving the camera shake correcting group perpendicularly to the optical axis AX as indicated by arrow mC, camera shake correction is achieved. Aspherical surfaces are both surfaces of the most object-side lens element in the fourth group Gr4, the object-side surface of the image-side doublet lens element in the fourth group Gr4, and the most object-side surface in the fifth group Gr5.

In the eighth embodiment (FIG. 8), the front groups GrF are composed of three groups, positive, negative, and negative respectively, and the rear groups GrR are composed of two groups, positive and positive respectively. During zooming, all the groups Gr1 to Gr5 move individually. The third group Gr3 is a focusing group, and is, as indicated by arrow mF, moved out toward the object side during focusing on a close-distance object. An aperture stop ST is located to the object side of the fourth group Gr4, and moves together with the fourth group Gr4 during zooming. A most image-side doublet lens element constituting the fourth group Gr4 constitutes a camera shake correcting group, and by moving the camera shake correcting group perpendicularly to the optical axis AX as indicated by arrow mC, camera shake correction is achieved. Aspherical surfaces are both surfaces of the most object-side lens element in the fourth group Gr4, the object-side surface of the image-side doublet lens element in the fourth group Gr4, and the most object-side surface in the fifth group Gr5.

In the ninth embodiment (FIG. 9), the front groups GrF are composed of three groups, positive, negative, and negative respectively, and the rear groups GrR are composed of three groups, positive, negative, and positive respectively. During zooming, all the groups Gr1 to Gr6 move individually. Notably, the fourth and sixth groups Gr4 and Gr6 move as an integral unit during zooming, and the fifth group Gr5 moves independently of them. The third group Gr3 is a focusing group, and is, as indicated by arrow mF, moved out toward the object side during focusing on a close-distance object. An aperture stop ST is located to the object side of the fourth group Gr4, and moves together with the fourth group Gr4 during zooming. A doublet lens element constituting the fifth group Gr5 constitutes a camera shake correcting group, and by moving the camera shake correcting group perpendicularly to the optical axis AX as indicated by arrow mC, camera shake correction is achieved. Aspherical surfaces are both surfaces of the most object-side lens element in the fourth group Gr4, the most object-side surface in the fifth group Gr5, and both surfaces of the most image-side lens element in the sixth group Gr6.

In the tenth embodiment (FIG. 10), the front groups GrF are composed of three groups, positive, negative, and negative respectively, and the rear groups GrR are composed of three groups, positive, negative, and positive respectively. During zooming, all the groups Gr1 to Gr6 move individually. Notably, the fourth and sixth groups Gr4 and Gr6 move as an integral unit during zooming, and the fifth group Gr5 moves independently of them. The third group Gr3 is a focusing group, and is, as indicated by arrow mF, moved out toward the object side during focusing on a close-distance object. An aperture stop ST is located to the object side of the fourth group Gr4, and moves together with the fourth group Gr4 during zooming. A doublet lens element constituting the fifth group Gr5 constitutes a camera shake correcting group, and by moving the camera shake correcting group perpendicularly to the optical axis AX as indicated by arrow mC, camera shake correction is achieved. Aspherical surfaces are both surfaces of the most object-side lens element in the fourth group Gr4, the most object-side surface in the fifth group Gr5, the most object-side surface in the sixth group Gr6, and both surfaces of the most image-side lens element in the sixth group Gr6.

In the eleventh embodiment (FIG. 11), the front groups GrF are composed of three groups, positive, negative, and negative respectively, and the rear groups GrR are composed of three groups, positive, negative, and positive respectively. During zooming, all the groups Gr1 to Gr6 move individually. Notably, the fourth and sixth groups Gr4 and Gr6 move as an integral unit during zooming, and the fifth group Gr5 moves independently of them. The third group Gr3 is a focusing group, and is, as indicated by arrow mF, moved out toward the object side during focusing on a close-distance object. An aperture stop ST is located to the object side of the fourth group Gr4, and moves together with the fourth group Gr4 during zooming. A doublet lens element constituting the fifth group Gr5 constitutes a camera shake correcting group, and by moving the camera shake correcting group perpendicularly to the optical axis AX as indicated by arrow mC, camera shake correction is achieved. Aspherical surfaces are the most image-side surface in the third group Gr3, both surfaces of the most object-side lens element in the fourth group Gr4, the most object-side surface in the fifth group Gr5, and both surfaces of the lens element in the second position from the object side in the sixth group Gr6.

EXAMPLES

Hereinafter, the construction and other features of zoom lens systems embodying the present invention will be described in more detail with reference to the construction and other data of practical examples. Examples 1 to 11 (EX1 to EX11) presented below are numerical examples corresponding to the first to eleventh embodiments, respectively, described above, and the lens construction diagrams (FIGS. 1 to 11) showing the first to eleventh embodiments also show the lens construction of the corresponding ones of Examples 1 to 11 respectively.

In the construction data of each practical example, listed as surface data are, from the leftmost column rightward, the ith radius of curvature ri (mm) as counted from the object side, the axial surface-to-surface distance di (mm), the refractive index Ni for the d-line (with a wavelength of 587.56 nm), and the Abbe number vi for the d-line. A surface whose radius of curvature ri is marked with an asterisk ("*") is an aspherical surface, of which the surface shape is defined by formula (AS) below in the local rectangular coordinate system (x, y, z) having its origin at the vertex of the surface. Listed as aspherical surface data are aspherical surface coefficients etc. In the aspherical surface data of each practical example, any missing term has a coefficient of 0, and throughout the data, "E-n" stands for "×10$^{-n}$."

$$z=(c \cdot h^2)/[1+\sqrt{(1-\epsilon \cdot c^2 \cdot h^2)}]+\Sigma(Aj \cdot h^j) \quad (AS)$$

where h represents the height in a direction perpendicular to the z axis (optical axis AX) ($h^2=x^2+y^2$);

z represents the amount of sag in the direction of the optical axis AX at the height h (relative to the vertex);

c represents the curvature at the vertex (the reciprocal of the radius of curvature r);

$\epsilon$ represents the quadric surface parameter; and

Aj represents the aspherical surface coefficient of order j.

Listed as miscellaneous data are the zoom ratio, the focal length (f, mm) of the entire system, the angle of view (2ω, °), the back focus (BF, mm), the total lens length (TL, mm), the f number (Fno.), and the image height (Y':Ymax, mm). Listed as zoom lens group data are the focal lengths (mm) of the individual lens groups. Table 1 shows the values corresponding to the conditional formulae in each practical example. The back focus is given as the air-equivalent length of the distance from the lens's last surface to the paraxial image surface, and the total lens length is the sum of the distance from the lens's foremost to last surface and the back focus.

FIGS. 12A-12I to 22A to 22I each comprise aberration diagrams corresponding to Examples 1 to 11 (EX1 to EX11) respectively. The diagrams in the rows indicated by (W), (M), and (T) show the aberrations observed at the wide-angle end, the middle-focal-length position, and the telephoto end respectively (the diagrams in each row showing, from left, spherical aberration etc., astigmatism, and distortion). In FIGS. 12A-12I to 22A to 22I, FNO represents the f number, and Y' (mm) represents the maximum image height Ymax on the light receiving surface SS of the image sensing device SR (corresponding to the distance from the optical axis AX). In the spherical aberration diagrams, the solid-line d, the dash-and-dot line g, and the clash-dot-dot line c indicate the spherical aberration (mm) for the d-, g-, and c-lines respectively, and the broken line SC indicates the deviation (mm) from the sine condition. In the astigmatism diagrams, the broken line DM and the solid line DS indicate the astigmatism (mm) for the d-line on the meridional and sagittal surfaces respectively. In the distortion diagrams, the solid line indicates the distortion (%) for the d-line.

Example 1

| | | Unit: mm | | | |
|---|---|---|---|---|---|
| | | Surface Data | | | |
| Radius of Curvature | | Axial Distance | Refractive Index | | Abbe Number |
| r1 | 87.894 | d1 1.200 | N1 | 1.84666 v1 | 23.78 |
| r2 | 36.541 | d2 6.403 | N2 | 1.83481 v2 | 42.72 |
| r3 | 220.816 | d3 0.200 | | | |
| r4 | 75.300 | d4 3.000 | N3 | 1.83481 v3 | 42.72 |
| r5 | 150.694 | d5 | 0.600~7.570~18.247 | | |
| r6 | 31.246 | d6 0.800 | N4 | 1.80420 v4 | 46.50 |
| r7 | 10.965 | d7 5.179 | | | |
| r8 | −196.480 | d8 0.800 | N5 | 1.81600 v5 | 46.62 |
| r9 | 18.161 | d9 0.184 | | | |
| r10 | 15.855 | d10 2.605 | N6 | 1.92286 v6 | 20.88 |
| r11 | 49.341 | d11 | 5.513~4.910~4.845 | | |
| r12 | −13.980 | d12 0.700 | N7 | 1.77250 v7 | 49.62 |
| r13 | 80.290 | d13 2.378 | N8 | 1.69895 v8 | 30.05 |
| r14 | −28.402 | d14 | 10.799~4.298~1.000 | | |
| r15 | Aperture | d15 0.707 | | | |
| r16* | 23.167 | d16 4.376 | N9 | 1.72916 v9 | 54.67 |
| r17* | −32.240 | d17 0.218 | | | |
| r18 | 26.460 | d18 4.442 | N10 | 1.49700 v10 | 81.61 |
| r19 | −20.005 | d19 0.010 | N11 | 1.51400 v11 | 42.83 |
| r20 | −20.005 | d20 0.800 | N12 | 1.84666 v12 | 23.78 |
| r21 | −178.729 | d21 | 1.722~2.927~3.520 | | |
| r22* | −51.254 | d22 0.137 | N13 | 1.53611 v13 | 42.00 |
| r23 | −51.254 | d23 0.600 | N14 | 1.90366 v14 | 31.32 |
| r24 | 10.697 | d24 3.547 | N15 | 1.84666 v15 | 23.78 |
| r25 | 127.086 | d25 | 3.397~2.192~1.599 | | |
| r26* | −106.975 | d26 0.200 | N16 | 1.51462 v16 | 50.00 |
| r27 | −51.099 | d27 0.980 | N17 | 1.84666 v17 | 23.78 |
| r28 | 63.439 | d28 0.150 | | | |
| r29 | 19.912 | d29 5.630 | N18 | 1.49700 v18 | 81.61 |
| r30 | −19.785 | d30 1.379 | | | |
| r31 | 29.549 | d31 3.612 | N19 | 1.76182 v19 | 26.61 |
| r32 | −139.956 | d32 3.057 | | | |
| r33 | −13.953 | d33 1.000 | N20 | 1.80610 v20 | 33.27 |
| r34 | −27.733 | | | | |

Aspherical Surface Data r16

$\epsilon = 1.0000$
A4 = −0.12273953E−04
A6 = −0.29402889E−07
A8 = −0.76459674E−09
A10 = 0.90679004E−11 r17

$\epsilon = 1.0000$
A4 = 0.79024075E−05
A6 = −0.26960949E−08
A8 = −0.11194360E−08
A10 = 0.11886900E−10 r22

$\epsilon = 1.0000$
A4 = 0.22917142E−04
A6 = 0.88622638E−07
A8 = 0.16370306E−09
A10 = 0.84661900E−13 r26

$\epsilon = 1.0000$
A4 = −0.39333838E−04
A6 = −0.10547657E−06
A8 = 0.75676634E−09
A10 = −0.92563072E−11

Unit: mm

Miscellaneous Data
Zoom Ratio: 2.79

|  | (W) | ~ | (M) | ~ | (T) |
|---|---|---|---|---|---|
| f = | 12.31 | ~ | 21.21 | ~ | 34.34 |
| 2ω = | 86.4° | ~ | 54.8° | ~ | 34.7° |
| BF = | 14.5 | ~ | 23.31 | ~ | 32.22 |
| TL = | 90.82 | ~ | 99.50 | ~ | 115.72 |
| FNO. = | 2.85 | ~ | 2.85 | ~ | 2.85 |
| Y' = | 10.8 | ~ | 10.8 | ~ | 10.8 |

Zoom Lens Group Data

| Group | Focal Length |
|---|---|
| 1st Group | 86.69 |
| 2nd Group | −17.02 |
| 3rd Group | −34.35 |
| 4th Group | 16.59 |
| 5th Group | −33.33 |
| 6th Group | 28.31 |

Example 2

Unit: mm

Surface Data

| | Radius of Curvature | Axial Distance | | Refractive Index | | Abbe Number |
|---|---|---|---|---|---|---|
| r1 | 122.677 | d1 | 1.200 | N1 | 1.84666 v1 | 23.78 |
| r2 | 41.567 | d2 | 6.002 | | | |
| r3 | 329.290 | d3 | 0.200 | | | |
| r4 | 64.562 | d4 | 3.427 | N3 | 1.83481 v3 | 42.72 |
| r5 | 157.343 | d5 | 0.600~7.375~17.917 | | | |
| r6 | 33.705 | d6 | 0.800 | N4 | 1.80420 v4 | 46.50 |
| r7 | 11.716 | d7 | 5.196 | | | |
| r8 | −101.623 | d8 | 1.090 | N5 | 1.81600 v5 | 46.62 |
| r9 | 11.576 | d9 | 0.010 | N6 | 1.51400 v6 | 42.83 |
| r10 | 11.576 | d10 | 3.397 | N7 | 1.92286 v7 | 20.88 |
| r11 | 48.822 | d11 | 6.381~5.150~4.809 | | | |
| r12 | −12.471 | d12 | 1.476 | N8 | 1.72916 v8 | 54.67 |
| r13 | −25.263 | d13 | 8.727~3.602~1.000 | | | |
| r14 | Aperture | d14 | 0.707 | | | |
| r15* | 23.594 | d15 | 4.347 | N9 | 1.72916 v9 | 54.67 |
| r16* | −29.117 | d16 | 0.200 | | | |
| r17 | 23.395 | d17 | 4.750 | N10 | 1.49700 v10 | 81.61 |
| r18 | −17.470 | d18 | 0.010 | N11 | 1.51400 v11 | 42.83 |
| r19 | −17.470 | d19 | 0.800 | N12 | 1.84666 v12 | 23.78 |
| r20 | −108.846 | d20 | 1.653~3.159~4.035 | | | |
| r21* | −49.971 | d21 | 0.127 | N13 | 1.53611 v13 | 42.00 |
| r22 | −49.971 | d22 | 0.600 | N14 | 1.90366 v14 | 31.32 |
| r23 | 10.204 | d23 | 3.576 | N15 | 1.84666 v15 | 23.78 |
| r24 | 208.812 | d24 | 4.162~2.656~1.780 | | | |
| r25* | −52.770 | d25 | 0.187 | N16 | 1.51460 v16 | 50.00 |
| r26 | −32.310 | d26 | 0.980 | N17 | 1.90466 v17 | 22.20 |
| r27 | 165.841 | d27 | 0.150 | | | |
| r28 | 21.321 | d28 | 5.612 | N18 | 1.49700 v18 | 81.61 |
| r29 | −18.400 | d29 | 0.965 | | | |
| r30 | 28.405 | d30 | 4.187 | N19 | 1.79920 v19 | 24.90 |
| r31 | −50.742 | d31 | 2.206 | | | |
| r32 | −16.099 | d32 | 0.800 | N20 | 1.80610 v20 | 33.27 |
| r33 | −108.743 | | | | | |

Aspherical Surface Data r15

$\epsilon = 1.0000$
A4 = −0.54591535E−05
A6 = −0.19208785E−07
A8 = −0.28617910E−09

-continued

| Unit: mm |
|---|
| A10 = −0.13467962E−11 |
| r16 |

| |
|---|
| ε = 1.0000 |
| A4 = 0.14087241E−04 |
| A6 = −0.10840278E−07 |
| A8 = −0.50420463E−09 |
| A10 = −0.16369063E−11 |
| r21 |

| |
|---|
| ε = 1.0000 |
| A4 = 0.25329863E−04 |
| A6 = 0.10711557E−06 |
| A8 = −0.19599191E−08 |
| A10 = 0.25963900E−10 |
| r25 |

| |
|---|
| ε = 1.0000 |
| A4 = −0.57935401E−04 |
| A6 = −0.27039756E−06 |
| A8 = 0.31584500E−08 |
| A10 = −0.56042305E−10 |

Miscellaneous Data
Zoom Ratio: 2.79

| | (W) | ~ | (M) | ~ | (T) |
|---|---|---|---|---|---|
| f = | 12.31 | ~ | 21.23 | ~ | 34.34 |
| 2ω = | 86.2° | ~ | 54.7° | ~ | 34.6° |
| BF = | 14.5 | ~ | 23.22 | ~ | 31.62 |
| TL = | 89.03 | ~ | 98.16 | ~ | 114.17 |
| FNO. = | 2.85 | ~ | 2.85 | ~ | 2.85 |
| Y' = | 10.8 | ~ | 10.8 | ~ | 10.8 |

Zoom Lens Group Data

| Group | Focal Length |
|---|---|
| 1st Group | 85.22 |
| 2nd Group | −14.85 |
| 3rd Group | −35.50 |
| 4th Group | 15.42 |
| 5th Group | −35.74 |
| 6th Group | 28.70 |

Example 3

| Unit: mm |
|---|
| Surface Data |

| Radius of Curvature | | Axial Distance | | Refractive Index | | Abbe Number |
|---|---|---|---|---|---|---|
| r1 | 105.326 | d1 | 1.200 | N1 | 1.79850 v1 | 22.60 |
| r2 | 36.833 | d2 | 6.107 | N2 | 1.88300 v2 | 40.80 |
| r3 | 188.327 | d3 | 0.200 | | | |
| r4 | 52.415 | d4 | 3.204 | N3 | 1.88243 v3 | 40.37 |
| r5 | 92.874 | d5 | 0.800~4.149~17.683 | | | |
| r6 | 39.587 | d6 | 0.800 | N4 | 1.88300 v4 | 40.80 |
| r7 | 10.691 | d7 | 5.396 | | | |
| r8 | 919.642 | d8 | 0.800 | N5 | 1.72814 v5 | 51.27 |
| r9 | 19.567 | d9 | 0.200 | | | |
| r10 | 15.229 | d10 | 2.666 | N6 | 1.84382 v6 | 23.75 |
| r11 | 35.806 | d11 | 4.568~7.247~5.929 | | | |
| r12 | −22.792 | d12 | 0.800 | N7 | 1.77001 v7 | 49.78 |
| r13 | 18.633 | d13 | 2.898 | N8 | 1.86361 v8 | 29.72 |
| r14* | −90.958 | d14 | 14.290~3.381~0.980 | | | |
| r15 | Aperture | d15 | 0.707 | | | |
| r16 | 25.749 | d16 | 2.000 | N9 | 1.85000 v9 | 25.64 |
| r17 | 14.610 | d17 | 4.394 | N10 | 1.71753 v10 | 51.69 |
| r18 | −90.842 | d18 | 0.565 | | | |
| r19 | 17.616 | d19 | 4.769 | N11 | 1.48749 v11 | 70.44 |

-continued

| | | | Unit: mm | | | |
|---|---|---|---|---|---|---|
| r20 | −29.476 | d20 | 0.250 | | | |
| r21 | −29.940 | d21 | 0.800 | N12 | 1.81752 v12 | 28.40 |
| r22 | 863.849 | d22 | 2.102~5.489~6.543 | | | |
| r23* | −251.627 | d23 | 0.104 | N13 | 1.53611 v13 | 42.00 |
| r24 | −251.627 | d24 | 0.600 | N14 | 1.78664 v14 | 27.60 |
| r25 | 9.254 | d25 | 3.833 | N15 | 1.79850 v15 | 22.60 |
| r26 | 113.391 | d26 | 5.758~2.361~1.322 | | | |
| r27* | 201.239 | d27 | 0.100 | N16 | 1.51465 v16 | 50.00 |
| r28 | 681.789 | d28 | 0.980 | N17 | 1.69636 v17 | 37.49 |
| r29 | 20.881 | d29 | 0.259 | | | |
| r30 | 17.173 | d30 | 3.102 | N18 | 1.48749 v18 | 70.44 |
| r31 | −172.218 | d31 | 0.214 | | | |
| r32 | 21.046 | d32 | 0.750 | N19 | 1.77591 v19 | 38.00 |
| r33 | 9.561 | d33 | 8.278 | N20 | 1.68617 v20 | 52.89 |
| r34 | 105.280 | | | | | |

Aspherical Surface Data r14

$\epsilon = 1.0000$
A4 = 0.81609160E−05
A6 = 0.36440968E−07
A8 = −0.56025311E−09
A10 = 0.83471300E−11 r23

$\epsilon = 1.0000$
A4 = −0.27609471E−05
A6 = 0.15825461E−06
A8 = −0.76029462E−09
A10 = 0.22001600E−10 r27

$\epsilon = 1.0000$
A4 = −0.82098003E−04
A6 = −0.34465816E−06
A8 = −0.10826337E−08
A10 = −0.29871608E−10

Miscellaneous Data
Zoom Ratio: 2.84

| | (W) | ~ | (M) | ~ | (T) |
|---|---|---|---|---|---|
| f = | 12.31 | ~ | 21.24 | ~ | 34.34 |
| 2ω = | 85.6° | ~ | 55.6° | ~ | 35.0° |
| BF = | 14.5 | ~ | 26.74 | ~ | 32.58 |
| TL = | 98.49 | ~ | 105.34 | ~ | 121.01 |
| FNO. = | 2.85 | ~ | 2.85 | ~ | 2.85 |
| Y' = | 10.8 | ~ | 10.8 | ~ | 10.8 |

Zoom Lens Group Data

| Group | Focal Length |
|---|---|
| 1st Group | 78.42 |
| 2nd Group | −15.13 |
| 3rd Group | −53.70 |
| 4th Group | 20.79 |
| 5th Group | −112.09 |
| 6th Group | 42.91 |

Example 4

| Unit: mm | | | | | | |
|---|---|---|---|---|---|---|
| Surface Data | | | | | | |
| Radius of Curvature | | | Axial Distance | Refractive Index | | Abbe Number |
| r1 | 105.325 | d1 | 1.200 | N1 | 1.84666 v1 | 23.78 |
| r2 | 41.320 | d2 | 5.849 | N2 | 1.83481 v2 | 42.72 |

-continued

| Unit: mm | | | | | | | |
|---|---|---|---|---|---|---|---|
| r3 | 273.684 | d3 | 0.200 | | | | |
| r4 | 71.272 | d4 | 3.000 | N3 | 1.83481 | ν3 | 42.72 |
| r5 | 142.006 | d5 | 0.800~8.029~18.894 | | | | |
| r6 | 37.280 | d6 | 0.800 | N4 | 1.80420 | ν4 | 46.50 |
| r7 | 11.532 | d7 | 5.298 | | | | |
| r8 | 3161.456 | d8 | 0.800 | N5 | 1.77250 | ν5 | 49.62 |
| r9 | 17.021 | d9 | 0.248 | | | | |
| r10 | 15.215 | d10 | 2.868 | N6 | 1.84666 | ν6 | 23.78 |
| r11 | 44.377 | d11 | 5.483~5.646~6.474 | | | | |
| r12 | −15.321 | d12 | 0.800 | N7 | 1.77250 | ν7 | 49.62 |
| r13 | 504.923 | d13 | 2.496 | N8 | 1.69038 | ν8 | 29.70 |
| r14* | −23.941 | d14 | 15.892~6.151~0.980 | | | | |
| r15 | Aperture | d15 | 0.707 | | | | |
| r16 | 24.927 | d16 | 5.475 | N9 | 1.72916 | ν9 | 54.67 |
| r17 | −53.189 | d17 | 1.000 | | | | |
| r18 | 25.172 | d18 | 5.000 | N10 | 1.49700 | ν10 | 81.61 |
| r19 | −17.956 | d19 | 0.010 | N11 | 1.51400 | ν11 | 42.83 |
| r20 | −17.956 | d20 | 0.800 | N12 | 1.85975 | ν12 | 28.16 |
| r21 | −90.593 | d21 | 1.725~2.787~3.325 | | | | |
| r22* | −42.958 | d22 | 0.123 | N13 | 1.53615 | ν13 | 41.00 |
| r23 | −42.958 | d23 | 0.600 | N14 | 1.86290 | ν14 | 29.42 |
| r24 | 10.309 | d24 | 3.996 | N15 | 1.84217 | ν15 | 23.92 |
| r25 | 112.813 | d25 | 3.483~2.410~1.887 | | | | |
| r26* | −66.079 | d26 | 0.200 | N16 | 1.51461 | ν16 | 50.00 |
| r27 | −38.714 | d27 | 0.980 | N17 | 1.84666 | ν17 | 23.78 |
| r28 | 211.477 | d28 | 0.150 | | | | |
| r29 | 22.115 | d29 | 5.591 | N18 | 1.49700 | ν18 | 81.61 |
| r30 | −21.233 | d30 | 2.593 | | | | |
| r31 | 35.583 | d31 | 3.438 | N19 | 1.84666 | ν19 | 23.78 |
| r32 | −167.215 | d32 | 3.000 | | | | |
| r33 | −15.426 | d33 | 1.000 | N20 | 1.86057 | ν20 | 28.47 |
| r34 | −29.707 | | | | | | |

Aspherical Surface Data
r14

$\epsilon = 1.0000$
A4 = −0.16874083E−05
A6 = 0.19974816E−07
A8 = −0.16239866E−09
A10 = 0.18778823E−11 r22

$\epsilon = 1.0000$
A4 = 0.10764908E−04
A6 = 0.19372388E−06
A8 = −0.92740207E−09
A10 = 0.56577300E−11 r26

$\epsilon = 1.0000$
A4 = −0.42027961E−04
A6 = −0.13769336E−06
A8 = 0.30881609E−09
A10 = −0.82320900E−11

Miscellaneous Data
Zoom Ratio: 2.79

| | (W) | ~ | (M) | ~ | (T) |
|---|---|---|---|---|---|
| f = | 12.31 | ~ | 21.22 | ~ | 34.34 |
| 2ω = | 86.1° | ~ | 54.7° | ~ | 34.7° |
| BF = | 14.5 | ~ | 24.14 | ~ | 33.8 |
| TL = | 100.6 | ~ | 107.38 | ~ | 123.59 |
| FNO. = | 2.85 | ~ | 2.85 | ~ | 2.85 |
| Y' = | 10.8 | ~ | 10.8 | ~ | 10.8 |

Zoom Lens Group Data

| Group | Focal Length |
|---|---|
| 1st Group | 94.31 |
| 2nd Group | −17.14 |
| 3rd Group | −52.80 |
| 4th Group | 19.44 |

-continued

| Unit: mm | |
|---|---|
| 5th Group | −33.33 |
| 6th Group | 29.67 |

Example 5

| Unit: mm | | | | | | |
|---|---|---|---|---|---|---|
| Surface Data | | | | | | |
| Radius of Curvature | | Axial Distance | | Refractive Index | | Abbe Number |
| r1 | 105.322 | d1 | 1.200 | N1 | 1.84666 v1 | 23.78 |
| r2 | 42.269 | d2 | 5.875 | N2 | 1.83481 v2 | 42.72 |
| r3 | 285.894 | d3 | 0.200 | | | |
| r4 | 78.931 | d4 | 3.000 | N3 | 1.83481 v3 | 42.72 |
| r5 | 160.646 | d5 | 0.800~8.030~18.856 | | | |
| r6 | 33.914 | d6 | 0.800 | N4 | 1.80420 v4 | 46.50 |
| r7 | 11.501 | d7 | 5.206 | | | |
| r8 | −15661.71 | d8 | 0.800 | N5 | 1.77250 v5 | 49.62 |
| r9 | 17.559 | d9 | 0.150 | | | |
| r10 | 15.277 | d10 | 2.799 | N6 | 1.84666 v6 | 23.78 |
| r11 | 44.577 | d11 | 5.155~5.006~5.616 | | | |
| r12 | −15.586 | d12 | 1.000 | N7 | 1.77250 v7 | 49.62 |
| r13 | 67.025 | d13 | 3.200 | N8 | 1.69895 v8 | 30.05 |
| r14 | −28.879 | d14 | 14.390~5.609~0.980 | | | |
| r15 | Aperture | d15 | 0.707 | | | |
| r16* | 26.766 | d16 | 4.306 | N9 | 1.72916 v9 | 54.67 |
| r17 | −41.786 | d17 | 0.301 | | | |
| r18 | 29.181 | d18 | 4.376 | N10 | 1.49700 v10 | 81.61 |
| r19 | −23.614 | d19 | 0.010 | N11 | 1.51400 v11 | 42.83 |
| r20 | −23.614 | d20 | 0.800 | N12 | 1.84666 v12 | 23.78 |
| r21 | −140.814 | d21 | 1.723~3.605~4.707 | | | |
| r22* | −51.402 | d22 | 0.137 | N13 | 1.52050 v13 | 51.02 |
| r23 | −51.402 | d23 | 0.600 | N14 | 1.90366 v14 | 31.32 |
| r24 | 11.999 | d24 | 3.661 | N15 | 1.84666 v15 | 23.78 |
| r25 | 719.228 | d25 | 4.508~2.626~1.524 | | | |
| r26* | −88.704 | d26 | 0.200 | N16 | 1.52050 v16 | 51.02 |
| r27 | −48.484 | d27 | 0.980 | N17 | 1.84666 v17 | 23.78 |
| r28 | 62.425 | d28 | 0.150 | | | |
| r29 | 20.125 | d29 | 5.898 | N18 | 1.49700 v18 | 81.61 |
| r30 | −21.155 | d30 | 2.230 | | | |
| r31 | 31.823 | d31 | 3.410 | N19 | 1.76182 v19 | 26.61 |
| r32 | −424.391 | d32 | 3.500 | | | |
| r33 | −13.596 | d33 | 1.000 | N20 | 1.80610 v20 | 33.27 |
| r34 | −23.303 | | | | | |

Aspherical Surface Data r16

$\epsilon = 1.0000$
A4 = −0.99862127E−05
A6 = −0.14350904E−07
A8 = −0.87050437E−10
A10 = 0.89497684E−13 r22

$\epsilon = 1.0000$
A4 = 0.17553659E−04
A6 = 0.95768761E−07
A8 = −0.51564099E−10
A10 = −0.12529106E−11 r26

$\epsilon = 1.0000$
A4 = −0.33271455E−04
A6 = −0.11328661E−06
A8 = 0.17428371E−08
A10 = −0.17428812E−10

-continued

| Unit: mm | | | | | |
|---|---|---|---|---|---|
| Miscellaneous Data Zoom Ratio: 2.79 | | | | | |
| | (W) | ~ | (M) | ~ | (T) |
| f = | 12.31 | ~ | 21.22 | ~ | 34.34 |
| 2ω = | 86° | ~ | 54.6° | ~ | 34.6° |
| BF = | 14.5 | ~ | 23.6 | ~ | 33.05 |
| TL = | 98.07 | ~ | 104.97 | ~ | 121.23 |
| FNO. = | 2.85 | ~ | 2.85 | ~ | 2.85 |
| Y' = | 10.8 | ~ | 10.8 | ~ | 10.8 |

| Zoom Lens Group Data | |
|---|---|
| Group | Focal Length |
| 1st Group | 97.38 |
| 2nd Group | −18.08 |
| 3rd Group | −42.55 |
| 4th Group | 19.06 |
| 5th Group | −42.36 |
| 6th Group | 33.77 |

Example 6

| Unit: mm | | | | | | |
|---|---|---|---|---|---|---|
| Surface Data | | | | | | |
| Radius of Curvature | | Axial Distance | Refractive Index | | Abbe Number | |
| r1 | 285.737 | d1 1.000 | N1 | 1.84666 | v1 | 23.78 |
| r2 | 69.505 | d2 5.194 | N2 | 1.77445 | v2 | 48.82 |
| r3 | 535.670 | d3 0.100 | | | | |
| r4 | 73.850 | d4 4.316 | N3 | 1.80906 | v3 | 43.96 |
| r5 | 383.969 | d5 | 0.800~13.201~24.228 | | | |
| r6 | 30.032 | d6 1.085 | N4 | 1.91082 | v4 | 35.25 |
| r7 | 11.926 | d7 5.483 | | | | |
| r8 | −151.299 | d8 0.698 | N5 | 1.75500 | v5 | 52.31 |
| r9 | 17.767 | d9 0.100 | | | | |
| r10 | 15.978 | d10 3.178 | N6 | 1.73751 | v6 | 28.40 |
| r11 | 93.860 | d11 | 4.201~6.761~6.135 | | | |
| r12 | −15.160 | d12 0.698 | N7 | 1.75500 | v7 | 52.31 |
| r13 | 36.166 | d13 2.756 | N8 | 1.84668 | v8 | 23.78 |
| r14 | −44.422 | d14 | 11.853~3.800~1.000 | | | |
| r15 | Aperture | d15 0.800 | | | | |
| r16* | 30.318 | d16 3.500 | N9 | 1.75500 | v9 | 52.31 |
| r17* | −87.680 | d17 0.100 | | | | |
| r18 | 19.670 | d18 4.958 | N10 | 1.49700 | v10 | 81.61 |
| r19 | −28.692 | d19 0.800 | N11 | 1.83711 | v11 | 24.05 |
| r20 | −86.788 | d20 1.000 | | | | |
| r21* | −78.255 | d21 0.155 | N12 | 1.56732 | v12 | 42.84 |
| r22 | −93.496 | d22 1.325 | N13 | 1.84666 | v13 | 23.78 |
| r23 | −72.476 | d23 0.800 | N14 | 1.72888 | v14 | 31.21 |
| r24 | 54.312 | d24 | 4.545~2.243~1.629 | | | |
| r25* | 56.008 | d25 0.155 | N15 | 1.51742 | v15 | 52.15 |
| r26 | 94.538 | d26 0.800 | N16 | 1.75205 | v16 | 35.30 |
| r27 | 40.608 | d27 0.100 | | | | |
| r28 | 25.180 | d28 4.500 | N17 | 1.77297 | v17 | 47.04 |
| r29 | −39.856 | d29 0.100 | | | | |
| r30 | 140.361 | d30 0.800 | N18 | 1.79023 | v18 | 44.33 |
| r31 | 12.199 | d31 6.006 | N19 | 1.49700 | v19 | 81.61 |
| r32 | −32.657 | d32 3.796 | | | | |
| r33 | −15.684 | d33 0.800 | N20 | 1.67790 | v20 | 50.71 |
| r34 | −22.430 | | | | | |

Aspherical Surface Data r16

$\epsilon = 1.0000$
A4 = 0.29524126E−04
A6 = 0.18308114E−06

-continued

Unit: mm

A8 = 0.56442901E−10
A10 = 0.43208000E−11
r17

ϵ = 1.0000
A4 = 0.45212546E−04
A6 = 0.15043237E−06
A8 = 0.11993442E−08
A10 = −0.15812553E−11
r21

ϵ = 1.2590
A4 = 0.19617382E−04
A6 = −0.14966509E−06
A8 = 0.15917821E−08
A10 = −0.68747200E−11
r25

ϵ = 1.0000
A4 = −0.62330372E−04
A6 = 0.11307780E−07
A8 = −0.81943825E−09
A10 = −0.71375918E−11

Miscellaneous Data
Zoom Ratio: 2.79

|  | (W) | ~ | (M) | ~ | (T) |
|---|---|---|---|---|---|
| f = | 12.31 | ~ | 22.00 | ~ | 34.33 |
| 2ω = | 87.8° | ~ | 51.3° | ~ | 33.8° |
| BF = | 14.5 | ~ | 25.07 | ~ | 33.7 |
| TL = | 91 | ~ | 106.18 | ~ | 121.79 |
| FNO. = | 2.88 | ~ | 2.88 | ~ | 2.88 |
| Y' = | 10.8 | ~ | 10.8 | ~ | 10.8 |

Zoom Lens Group Data

| Group | Focal Length |
|---|---|
| 1st Group | 107.16 |
| 2nd Group | −17.75 |
| 3rd Group | −37.82 |
| 4th Group | 24.45 |
| 5th Group | 34.65 |

Example 7

Unit: mm
Surface Data

| Radius of Curvature | | Axial Distance | | Refractive Index | | Abbe Number |
|---|---|---|---|---|---|---|
| r1 | 272.742 | d1 | 1.000 | N1 | 1.84666 v1 | 23.78 |
| r2 | 55.903 | d2 | 5.258 | N2 | 1.78490 v2 | 47.20 |
| r3 | 427.870 | d3 | 0.100 | | | |
| r4 | 58.790 | d4 | 4.242 | N3 | 1.83889 v3 | 40.73 |
| r5 | 259.123 | d5 | 0.800~11.257~19.680 | | | |
| r6 | 33.735 | d6 | 1.085 | N4 | 1.91082 v4 | 35.25 |
| r7 | 12.041 | d7 | 5.493 | | | |
| r8 | −91.132 | d8 | 0.698 | N5 | 1.76581 v5 | 50.30 |
| r9 | 17.951 | d9 | 0.100 | | | |
| r10 | 16.382 | d10 | 3.178 | N6 | 1.74077 v6 | 27.78 |
| r11 | 219.974 | d11 | 4.042~6.771~6.002 | | | |
| r12 | −15.257 | d12 | 0.698 | N7 | 1.75500 v7 | 52.31 |
| r13 | 35.053 | d13 | 2.806 | N8 | 1.84666 v8 | 23.78 |
| r14 | −45.342 | d14 | 11.958~3.849~1.000 | | | |
| r15 | Aperture | d15 | 0.800 | | | |
| r16* | 30.232 | d16 | 3.500 | N9 | 1.75500 v9 | 52.31 |
| r17* | −84.761 | d17 | 0.100 | | | |
| r18 | 19.614 | d18 | 4.936 | N10 | 1.49700 v10 | 81.61 |
| r19 | −29.203 | d19 | 0.800 | N11 | 1.83674 v11 | 24.06 |

-continued

| Unit: mm | | | | | | | |
|---|---|---|---|---|---|---|---|
| r20 | −88.518 | d20 | 1.000 | | | | |
| r21* | −71.709 | d21 | 0.155 | N12 | 1.56732 | v12 | 42.84 |
| r22 | −86.022 | d22 | 1.298 | N13 | 1.84666 | v13 | 23.78 |
| r23 | −71.255 | d23 | 0.800 | N14 | 1.72878 | v14 | 31.78 |
| r24 | 58.001 | d24 | 4.709~2.215~1.566 | | | | |
| r25* | 54.318 | d25 | 0.155 | N15 | 1.51742 | v15 | 52.15 |
| r26 | 88.247 | d26 | 0.800 | N16 | 1.75394 | v16 | 34.48 |
| r27 | 38.865 | d27 | 0.100 | | | | |
| r28 | 24.921 | d28 | 4.500 | N17 | 1.77225 | v17 | 49.19 |
| r29 | −39.772 | d29 | 0.100 | | | | |
| r30 | 148.068 | d30 | 0.800 | N18 | 1.79056 | v18 | 45.11 |
| r31 | 12.163 | d31 | 6.142 | N19 | 1.49700 | v19 | 81.61 |
| r32 | −31.961 | d32 | 3.550 | | | | |
| r33 | −15.306 | d33 | 0.800 | N20 | 1.68122 | v20 | 50.78 |
| r34 | −21.973 | | | | | | |

Aspherical Surface Data r16

$\epsilon = 1.0000$
A4 = 0.29593197E−04
A6 = 0.18456960E−06
A8 = 0.66395254E−10
A10 = 0.43752100E−11 r17

$\epsilon = 1.0000$
A4 = 0.45112478E−04
A6 = 0.15253357E−06
A8 = 0.12153219E−08
A10 = −0.16022100E−11 r21

$\epsilon = 1.2590$
A4 = 0.20060981E−04
A6 = −0.15180707E−06
A8 = 0.16086820E−08
A10 = −0.68756100E−11 r25

$\epsilon = 1.0000$
A4 = −0.62239596E−04
A6 = 0.15074034E−07
A8 = −0.80968940E−09
A10 = −0.74318850E−11

Miscellaneous Data
Zoom Ratio: 2.79

| | (W) | ~ | (M) | ~ | (T) |
|---|---|---|---|---|---|
| f = | 12.31 | ~ | 22.00 | ~ | 34.33 |
| 2ω = | 87.8° | ~ | 51.6° | ~ | 34.1° |
| BF = | 14.5 | ~ | 24.95 | ~ | 33.67 |
| TL = | 91 | ~ | 104.04 | ~ | 116.91 |
| FNO. = | 2.88 | ~ | 2.88 | ~ | 2.88 |
| Y' = | 10.8 | ~ | 10.8 | ~ | 10.8 |

Zoom Lens Group Data

| Group | Focal Length |
|---|---|
| 1st Group | 89.00 |
| 2nd Group | −16.99 |
| 3rd Group | −37.81 |
| 4th Group | 24.23 |
| 5th Group | 35.41 |

Example 8

| | | | Unit: mm | | | |
|---|---|---|---|---|---|---|
| | | | Surface Data | | | |
| Radius of Curvature | | Axial Distance | | Refractive Index | | Abbe Number |
| r1 | 105.323 | d1 | 1.200 | N1 1.84666 | v1 | 23.78 |
| r2 | 38.757 | d2 | 6.433 | N2 1.83481 | v2 | 42.72 |
| r3 | 366.691 | d3 | 0.200 | | | |
| r4 | 59.115 | d4 | 3.372 | N3 1.83481 | v3 | 42.72 |
| r5 | 118.112 | d5 | 0.600~6.712~17.447 | | | |
| r6 | 32.045 | d6 | 0.800 | N4 1.80420 | v4 | 46.50 |
| r7 | 10.622 | d7 | 5.332 | | | |
| r8 | −56.667 | d8 | 0.800 | N5 1.81600 | v5 | 46.62 |
| r9 | 19.796 | d9 | 0.166 | | | |
| r10 | 16.829 | d10 | 2.713 | N6 1.92286 | v6 | 20.88 |
| r11 | 110.291 | d11 | 5.245~6.075~4.548 | | | |
| r12 | −13.196 | d12 | 0.700 | N7 1.77250 | v7 | 49.62 |
| r13 | −656.241 | d13 | 2.031 | N8 1.69895 | v8 | 30.05 |
| r14 | −28.285 | d14 | 10.278~3.339~1.000 | | | |
| r15 | Aperture | d15 | 0.707 | | | |
| r16* | 22.409 | d16 | 4.390 | N9 1.72916 | v9 | 54.67 |
| r17* | −30.407 | d17 | 0.207 | | | |
| r18 | 31.732 | d18 | 4.205 | N10 1.49700 | v10 | 81.61 |
| r19 | −19.324 | d19 | 0.010 | N11 1.51400 | v11 | 42.83 |
| r20 | −19.324 | d20 | 0.800 | N12 1.84666 | v12 | 23.78 |
| r21 | −80.692 | d21 | 1.620 | | | |
| r22* | −49.767 | d22 | 0.139 | N13 1.53610 | v13 | 41.20 |
| r23 | −49.767 | d23 | 0.600 | N14 1.90366 | v14 | 31.32 |
| r24 | 11.892 | d24 | 3.269 | N15 1.84666 | v15 | 23.78 |
| r25 | 126.505 | d25 | 3.452~2.228~1.902 | | | |
| r26* | −57.381 | d26 | 0.199 | N16 1.51460 | v16 | 49.96 |
| r27 | −34.394 | d27 | 0.980 | N17 1.84666 | v17 | 23.78 |
| r28 | 148.027 | d28 | 0.150 | | | |
| r29 | 20.848 | d29 | 5.791 | N18 1.49700 | v18 | 81.61 |
| r30 | −21.026 | d30 | 2.374 | | | |
| r31 | 39.197 | d31 | 3.688 | N19 1.76182 | v19 | 26.61 |
| r32 | −64.061 | d32 | 2.881 | | | |
| r33 | −14.148 | d33 | 1.000 | N20 1.80610 | v20 | 33.27 |
| r34 | −26.939 | | | | | |

Aspherical Surface Data r16

ϵ = 1.0000
A4 = −0.11638957E−04
A6 = 0.74220931E−08
A8 = −0.67574111E−09
A10 = 0.90513869E−11 r17

ϵ = 1.0000
A4 = 0.13590710E−04
A6 = 0.34303561E−07
A8 = −0.93384347E−09
A10 = 0.10518300E−10 r22

ϵ = 1.0000
A4 = 0.19799010E−04
A6 = 0.93998631E−07
A8 = 0.16816925E−08
A10 = −0.21519500E−10 r26

ϵ = 1.0000
A4 = −0.48527473E−04
A6 = −0.20531842E−06
A8 = −0.47445207E−10
A10 = −0.30144228E−11

| Unit: mm | | | | |
|---|---|---|---|---|
| Miscellaneous Data Zoom Ratio: 2.79 | | | | |
| | (W) | ~ (M) | ~ | (T) |
| f = | 12.31 | ~ 21.22 | ~ | 34.34 |
| 2ω = | 86.2° | ~ 54.6° | ~ | 34.6° |
| BF = | 14.5 | ~ 25.6 | ~ | 33.48 |
| TL = | 90.83 | ~ 100.71 | ~ | 115.13 |
| FNO. = | 2.85 | ~ 2.85 | ~ | 2.85 |
| Y' = | 10.8 | ~ 10.8 | ~ | 10.8 |

| Zoom Lens Group Data | |
|---|---|
| Group | Focal Length |
| 1st Group | 79.37 |
| 2nd Group | −16.46 |
| 3rd Group | −31.83 |
| 4th Group | 21.48 |
| 5th Group | 30.17 |

Example 9

| Unit: mm | | | | | |
|---|---|---|---|---|---|
| Surface Data | | | | | |
| Radius of Curvature | | Axial Distance | Refractive Index | | Abbe Number |
| r1 | 48.974 | d1 1.200 | N1 | 1.92286 v1 | 20.88 |
| r2 | 25.567 | d2 0.005 | N2 | 1.51400 v2 | 42.83 |
| r3 | 25.567 | d3 7.829 | N3 | 1.91082 v3 | 35.25 |
| r4 | 135.631 | d4 0.600~4.460~15.877 | | | |
| r5 | 36.564 | d5 0.800 | N4 | 1.80420 v4 | 46.50 |
| r6 | 11.317 | d6 7.000 | | | |
| r7 | −213.084 | d7 1.100 | N5 | 1.81600 v5 | 46.62 |
| r8 | 11.615 | d8 0.010 | N6 | 1.51400 v6 | 42.83 |
| r9 | 11.615 | d9 3.081 | N7 | 1.92286 v7 | 20.88 |
| r10 | 32.566 | d10 7.512~5.891~5.310 | | | |
| r11 | −13.060 | d11 0.700 | N8 | 1.72916 v8 | 54.67 |
| r12 | −22.041 | d12 8.610~3.252~1.000 | | | |
| r13 | Aperture | d13 0.707 | | | |
| r14* | 25.828 | d14 3.644 | N9 | 1.72916 v9 | 54.67 |
| r15* | −54.883 | d15 0.486 | | | |
| r16 | 27.121 | d16 6.221 | N10 | 1.49700 v10 | 81.61 |
| r17 | −16.500 | d17 0.010 | N11 | 1.51400 v11 | 42.83 |
| r18 | −16.500 | d18 1.825 | N12 | 1.84666 v12 | 23.78 |
| r19 | −21.603 | d19 1.500~3.170~4.300 | | | |
| r20* | −10334.94 | d20 0.100 | N13 | 1.53610 v13 | 41.2 |
| r21 | −10334.94 | d21 0.900 | N14 | 1.83481 v14 | 42.72 |
| r22 | 37.052 | d22 3.800~2.129~1.000 | | | |
| r23 | 21.720 | d23 4.804 | N15 | 1.49700 v15 | 81.61 |
| r24 | −16.749 | d24 0.813 | | | |
| r25 | −13.802 | d25 0.980 | N16 | 1.86349 v16 | 26.50 |
| r26 | 37.253 | d26 2.004 | | | |
| r27* | 23.434 | d27 5.000 | N17 | 1.82114 v17 | 24.06 |
| r28* | −72.816 | | | | |

| Aspherical Surface Data |
|---|
| r14 |

ε = 1.0000
A4 = −0.80479274E−05
A6 = −0.48490945E−07
A8 = −0.47005852E−09
A10 = −0.48112776E−11 r15

ε = 1.0000
A4 = 0.27198828E−04
A6 = 0.98304133E−08

|  |  |
|---|---|
| Unit: mm | |
| A8 = −0.47686182E−09 | |
| A10 = −0.37709400E−11 | |
| r20 | |
| ε = 1.0000 | |
| A4 = 0.21745279E−05 | |
| A6 = 0.23558452E−07 | |
| A8 = −0.62690468E−09 | |
| A10 = 0.10114800E−10 | |
| r27 | |
| ε = 1.0000 | |
| A4 = −0.41979674E−05 | |
| A6 = 0.10043528E−06 | |
| A8 = 0.47090356E−09 | |
| A10 = 0.11079600E−10 | |
| r28 | |
| ε = 1.0000 | |
| A4 = 0.39505508E−04 | |
| A6 = 0.22328232E−06 | |
| A8 = −0.20238817E−08 | |
| A10 = 0.32872134E−10 | |

Miscellaneous Data
Zoom Ratio: 2.79

|  | (W) | ~ | (M) | ~ | (T) |
|---|---|---|---|---|---|
| f = | 12.20 | ~ | 21.05 | ~ | 34.03 |
| 2ω = | 87.7° | ~ | 55.9° | ~ | 35.3° |
| BF = | 14.81 | ~ | 24.81 | ~ | 32.24 |
| TL = | 86.05 | ~ | 92.93 | ~ | 108.95 |
| FNO. = | 2.85 | ~ | 2.85 | ~ | 2.85 |
| Y' = | 10.8 | ~ | 10.8 | ~ | 10.8 |

Zoom Lens Group Data

| Group | Focal Length |
|---|---|
| 1st Group | 81.65 |
| 2nd Group | −12.29 |
| 3rd Group | −45.45 |
| 4th Group | 14.67 |
| 5th Group | −44.22 |
| 6th Group | 56.57 |

Example 10

Unit: mm

Surface Data

| Radius of Curvature | | Axial Distance | | Refractive Index | | Abbe Number |
|---|---|---|---|---|---|---|
| r1 | 42.523 | d1 | 1.200 | N1 1.84666 | v1 | 23.78 |
| r2 | 28.097 | d2 | 0.005 | N2 1.51400 | v2 | 42.83 |
| r3 | 28.097 | d3 | 7.094 | N3 1.75500 | v3 | 52.30 |
| r4 | 154.937 | d4 | 0.600~3.997~14.700 | | | |
| r5 | 35.175 | d5 | 0.800 | N4 1.80420 | v4 | 46.50 |
| r6 | 11.236 | d6 | 6.927 | | | |
| r7 | −228.938 | d7 | 1.100 | N5 1.81600 | v5 | 46.62 |
| r8 | 11.334 | d8 | 0.010 | N6 1.51400 | v6 | 42.83 |
| r9 | 11.334 | d9 | 3.189 | N7 1.92286 | v7 | 20.88 |
| r10 | 32.691 | d10 | 7.361~5.817~5.377 | | | |
| r11 | −13.154 | d11 | 0.700 | N8 1.72916 | v8 | 54.67 |
| r12 | −22.298 | d12 | 8.802~3.400~1.000 | | | |
| r13 | Aperture | d13 | 0.707 | | | |
| r14* | 24.518 | d14 | 3.922 | N9 1.72916 | v9 | 54.67 |
| r15* | −66.645 | d15 | 0.517 | | | |
| r16 | 21.729 | d16 | 6.157 | N10 1.49700 | v10 | 81.61 |
| r17 | −20.341 | d17 | 0.010 | N11 1.51400 | v11 | 42.83 |
| r18 | −20.341 | d18 | 1.135 | N12 1.84666 | v12 | 23.78 |

-continued

| Unit: mm | | | | | | |
|---|---|---|---|---|---|---|
| r19 | −31.520 | d19 | 1.500~2.926~3.840 | | | |
| r20* | −244.805 | d20 | 0.100 | N13 1.53610 | v13 | 41.20 |
| r21 | −244.805 | d21 | 0.900 | N14 1.83481 | v14 | 42.72 |
| r22 | 48.372 | d22 | 3.340~1.915~1.000 | | | |
| r23* | 22.966 | d23 | 4.536 | N15 1.49700 | v15 | 81.61 |
| r24 | −20.269 | d24 | 0.010 | N16 1.51400 | v16 | 42.83 |
| r25 | −20.269 | d25 | 0.980 | N17 1.81020 | v17 | 26.80 |
| r26 | 35.497 | d26 | 3.053 | | | |
| r27* | 20.686 | d27 | 3.594 | N18 1.84660 | v18 | 23.70 |
| r28* | 137.642 | | | | | |

Aspherical Surface Data r14

$\epsilon = 1.0000$
A4 = 0.29468159E−06
A6 = 0.36512084E−07
A8 = −0.10828641E−08
A10 = 0.29188600E−11 r15

$\epsilon = 1.0000$
A4 = 0.18362104E−04
A6 = 0.57248831E−07
A8 = −0.10408237E−08
A10 = 0.13487719E−11 r20

$\epsilon = 1.0000$
A4 = −0.16235677E−05
A6 = 0.30820437E−06
A8 = −0.40625272E−08
A10 = 0.17673875E−10 r23

$\epsilon = 1.0000$
A4 = −0.24196220E−04
A6 = −0.80992542E−06
A8 = 0.28878558E−08
A10 = −0.46962964E−10 r27

$\epsilon = 1.0000$
A4 = −0.26581501E−04
A6 = 0.14976429E−06
A8 = −0.30416054E−09
A10 = 0.14726996E−10 r28

$\epsilon = 1.0000$
A4 = 0.25773336E−04
A6 = 0.93094976E−07
A8 = −0.15458513E−08
A10 = 0.28254900E−10

Miscellaneous Data
Zoom Ratio: 2.79

| | (W) | ~ | (M) | ~ | (T) |
|---|---|---|---|---|---|
| f = | 12.20 | ~ | 21.04 | ~ | 34.03 |
| 2ω = | 87.7° | ~ | 56° | ~ | 35.4° |
| BF = | 16.37 | ~ | 26.94 | ~ | 35.67 |
| TL = | 84.61 | ~ | 91.64 | ~ | 108.23 |
| FNO. = | 2.85 | ~ | 2.85 | ~ | 2.85 |
| Y' = | 10.8 | ~ | 10.8 | ~ | 10.8 |

Zoom Lens Group Data

| Group | Focal Length |
|---|---|
| 1st Group | 81.90 |
| 2nd Group | −12.50 |
| 3rd Group | −45.45 |
| 4th Group | 15.06 |

| | | |
|---|---|---|
| 5th Group | −48.31 | |
| 6th Group | 49.69 | |

Example 11

Unit: mm

Surface Data

| | Radius of Curvature | | Axial Distance | Refractive Index | | Abbe Number |
|---|---|---|---|---|---|---|
| r1 | 57.395 | d1 | 1.200 | N1 1.84666 | ν1 | 23.78 |
| r2 | 24.034 | d2 | 0.005 | N2 1.51400 | ν2 | 42.83 |
| r3 | 24.034 | d3 | 8.518 | N3 1.91082 | ν3 | 35.25 |
| r4 | 134.654 | d4 | 0.600~6.300~16.617 | | | |
| r5 | 32.125 | d5 | 0.800 | N4 1.80420 | ν4 | 46.50 |
| r6 | 10.810 | d6 | 6.069 | | | |
| r7 | 344.312 | d7 | 1.100 | N5 1.81600 | ν5 | 46.62 |
| r8 | 11.001 | d8 | 0.010 | N6 1.51400 | ν6 | 42.83 |
| r9 | 11.001 | d9 | 3.219 | N7 1.92286 | ν7 | 20.88 |
| r10 | 27.200 | d10 | 6.602~4.798~5.464 | | | |
| r11 | −12.891 | d11 | 0.700 | N8 1.72916 | ν8 | 54.67 |
| r12* | −21.580 | d12 | 9.622~4.334~1.000 | | | |
| r13 | Aperture | d13 | 0.707 | | | |
| r14* | 28.940 | d14 | 3.685 | N9 1.72916 | ν9 | 54.67 |
| r15* | −45.771 | d15 | 0.399 | | | |
| r16 | 20.506 | d16 | 6.038 | N10 1.49700 | ν10 | 81.61 |
| r17 | −19.895 | d17 | 0.010 | N11 1.51400 | ν11 | 42.83 |
| r18 | −19.895 | d18 | 0.800 | N12 1.84666 | ν12 | 23.78 |
| r19 | −30.362 | d19 | 1.500~2.953~3.767 | | | |
| r20* | 1212.224 | d20 | 0.100 | N13 1.53610 | ν13 | 41.20 |
| r21 | 1212.224 | d21 | 0.900 | N14 1.83481 | ν14 | 42.72 |
| r22 | 32.062 | d22 | 3.267~1.814~1.000 | | | |
| r23 | 138.483 | d23 | 1.080 | N15 1.90366 | ν15 | 31.32 |
| r24 | 20.492 | d24 | 0.235 | | | |
| r25* | 16.087 | d25 | 3.689 | N16 1.49700 | ν16 | 81.61 |
| r26* | −30.773 | d26 | 7.121 | | | |
| r27 | 32.382 | d27 | 1.797 | N17 1.84666 | ν17 | 23.78 |
| r28 | 64.096 | | | | | |

Aspherical Surface Data r12

$\epsilon = 1.2200$
A4 = −0.53305488E−05
A6 = −0.28357246E−07
A8 = −0.51736711E−09
A10 = 0.18553073E−10 r14

$\epsilon = 1.0000$
A4 = −0.12685400E−04
A6 = 0.62072155E−07
A8 = −0.26594461E−08
A10 = 0.19605314E−12 r15

$\epsilon = 1.0000$
A4 = 0.12855874E−04
A6 = 0.37769679E−07
A8 = −0.20728897E−08
A10 = −0.65099845E−11 r20

$\epsilon = 1.0000$
A4 = 0.12549374E−04
A6 = 0.12388371E−06
A8 = −0.54929604E−08
A10 = 0.43554400E−10

-continued

Unit: mm r25

$\epsilon = 1.0000$
A4 = −0.60003649E−04
A6 = −0.28932754E−06
A8 = 0.82223837E−08
A10 = −0.55676564E−10 r26

$\epsilon = 1.0000$
A4 = 0.43398312E−04
A6 = 0.20071818E−06
A8 = 0.17495455E−08
A10 = 0.16774479E−10

Miscellaneous Data
Zoom Ratio: 2.79

|  | (W) | ~ | (M) | ~ | (T) |
|---|---|---|---|---|---|
| f = | 12.20 | ~ | 21.03 | ~ | 34.03 |
| 2ω = | 87.8° | ~ | 55.7° | ~ | 35.1° |
| BF = | 14.85 | ~ | 24.21 | ~ | 34.18 |
| TL = | 84.62 | ~ | 92.59 | ~ | 110.21 |
| FNO. = | 2.85 | ~ | 2.85 | ~ | 2.85 |
| Y' = | 10.8 | ~ | 10.8 | ~ | 10.8 |

Zoom Lens Group Data

| Group | Focal Length |
|---|---|
| 1st Group | 89.12 |
| 2nd Group | −12.64 |
| 3rd Group | −45.45 |
| 4th Group | 14.46 |
| 5th Group | −39.46 |
| 6th Group | 43.76 |

TABLE 1

| | (1) frw/ Ymax | (2) f2/f3 | (3) f4/f5 | (4) f4/f6 | (5) f1/fw | (6) β2t/β2w | (7) βrt/ βrw | (8) (6)/(7) |
|---|---|---|---|---|---|---|---|---|
| EX 1 | 1.77 | 0.50 | — | 0.59 | 7.29 | 1.36 | 2.06 | 1.52 |
| EX 2 | 1.66 | 0.42 | — | 0.54 | 6.92 | 1.39 | 2.01 | 1.44 |
| EX 3 | 1.99 | 0.28 | — | 0.48 | 6.37 | 1.39 | 2.01 | 1.45 |
| EX 4 | 2.08 | 0.32 | — | 0.66 | 7.66 | 1.31 | 2.18 | 1.66 |
| EX 5 | 1.99 | 0.42 | — | 0.56 | 7.91 | 1.30 | 2.14 | 1.64 |
| EX 6 | 1.73 | 0.47 | 0.71 | — | 8.71 | 1.33 | 2.10 | 1.58 |
| EX 7 | 1.73 | 0.45 | 0.68 | — | 7.23 | 1.33 | 2.10 | 1.58 |
| EX 8 | 1.77 | 0.52 | 0.71 | — | 6.45 | 1.40 | 1.99 | 1.41 |
| EX 9 | 1.70 | 0.27 | — | 0.26 | 6.69 | 1.38 | 2.06 | 1.49 |
| EX 10 | 1.69 | 0.27 | — | 0.30 | 6.71 | 1.34 | 2.09 | 1.56 |
| EX 11 | 1.70 | 0.28 | — | 0.33 | 7.31 | 1.33 | 2.09 | 1.57 |

LIST OF REFERENCE SIGNS

DU digital device
LU imaging optical device
ZL zoom lens system
Gr1 first group
Gr2 second group
Gr3 third group
Gr4 fourth group
Gr5 fifth group
Gr6 sixth group
GrF front groups
GrR rear groups
ST stop (aperture stop)
SR image sensing device
SS light receiving surface (imaging surface)
IM image plane (optical image)
AX optical axis
1 signal processing section
2 control section
3 memory
4 operation section
5 display section

The invention claimed is:

1. A zoom lens system for forming an optical image of an object on a light receiving surface with a diagonal length of 2Ymax of an image sensing device for converting the optical image into an electrical signal,
the zoom lens system being composed of, from an object side, a first group having a positive optical power, a second group having a negative optical power, a third group having a negative optical power, an aperture stop, and a plurality of groups having a positive optical power as a whole,
the zoom lens system achieving zooming by varying distances between the groups,
wherein the zoom lens system achieves focusing by moving the third group, and
wherein the zoom lens system fulfills conditional formulae (1) and (2) below:

$$1.5 < frw/Y\text{max} < 2.1 \qquad 1$$

$$0.25 < f2/f3 < 0.6 \qquad 2$$

where, when the plurality of groups located to an image side of the aperture stop are referred to as rear groups, frw represents a composite focal length of the rear groups at a wide-angle end;
Ymax represents a maximum image height;
f2 represents a focal length of the second group; and
f3 represents a focal length of the third group,
wherein the rear groups are composed of, from the object side, a fourth group having a positive optical power and a fifth group having a positive optical power.

2. The zoom lens system according to claim 1, wherein the zoom lens system fulfills conditional formula (3) below:

$$0.6 < f4/f5 < 0.8 \quad (3)$$

where
f4 represents a focal length of the fourth group; and
f5 represents a focal length of the fifth group.

3. The zoom lens system according to claim 1, wherein the zoom lens system achieves camera shake correction by moving part of the fourth group perpendicularly to an optical axis.

4. The zoom lens system according to claim 1, wherein the zoom lens system fulfills conditional formula (5) below:

$$6 < f1/fw < 9 \quad (5)$$

where
f1 represents a focal length of the first group; and
fw represents a focal length of the entire system at a wide-angle end.

5. The zoom lens system according to claim 1, wherein the zoom lens system fulfills conditional formulae (6) to (8) below:

$$1.1 < \beta 23t/\beta 23w < 1.5 \quad (6)$$

$$1.9 < \beta rt/\beta rw < 2.3 \quad (7)$$

$$1.3 < (\beta 23t/\beta 23w)/(\beta rt/\beta rw) < 1.7 \quad (8)$$

where
$\beta 23t$ represents a composite lateral magnification of the second and third groups at a telephoto end;
$\beta 23w$ represents a composite lateral magnification of the second and third groups at a wide-angle end;
$\beta rt$ represents a composite lateral magnification of the rear groups at the telephoto end; and
$\beta rw$ represents a composite lateral magnification of the rear groups at the wide-angle end.

6. The zoom lens system according to claim 1, wherein the zoom lens system has an f number of three or less.

7. The zoom lens system according to claim 1, wherein the zoom lens system is an interchangeable lens for a digital camera.

8. An imaging optical device comprising the zoom lens system according to claim 1 and an image sensing device for converting an optical image formed on a light receiving surface into an electrical signal,
wherein the zoom lens system is arranged such that an optical image of a subject is formed on the light receiving surface of the image sensing device.

9. A digital device comprising the imaging optical device according to claim 8 so as to additionally have at least one of a function of taking a still picture of the subject or a function of taking a moving picture of the subject.

10. The zoom lens system according to claim 2, wherein the zoom lens system achieves camera shake correction by moving part of the fourth group perpendicularly to an optical axis.

11. The zoom lens system according to claim 1, wherein the zoom lens system fulfills conditional formula (5) below:

$$6 < f1/fw < 9 \quad (5)$$

where
f1 represents a focal length of the first group; and
fw represents a focal length of the entire system at a wide-angle end.

12. The zoom lens system according to claim 1, wherein the zoom lens system fulfills conditional formulae (6) to (8) below:

$$1.1 < \beta 23t/\beta 23w < 1.5 \quad (6)$$

$$1.9 < \beta rt/\beta rw < 2.3 \quad (7)$$

$$1.3 < (\beta 23t/\beta 23w)/(\beta rt/\beta rw) < 1.7 \quad (8)$$

where
$\beta 23t$ represents a composite lateral magnification of the second and third groups at a telephoto end;
$\beta 23w$ represents a composite lateral magnification of the second and third groups at a wide-angle end;
$\beta rt$ represents a composite lateral magnification of the rear groups at the telephoto end; and
$\beta rw$ represents a composite lateral magnification of the rear groups at the wide-angle end.

13. The zoom lens system according to claim 1, wherein the zoom lens system has an f number of three or less.

14. A zoom lens system for forming an optical image of an object on a light receiving surface with a diagonal length of 2Ymax of an image sensing device for converting the optical image into an electrical signal,
the zoom lens system being composed of, from an object side, a first group having a positive optical power, a second group having a negative optical power, a third group having a negative optical power, an aperture stop, and a plurality of groups having a positive optical power as a whole,
the zoom lens system achieving zooming by varying distances between the groups,
wherein the zoom lens system achieves focusing by moving the third group, and
wherein the zoom lens system fulfills conditional formulae (1) and (2) below:

$$1.5 < frw/Ymax < 2.1 \quad (1)$$

$$0.25 < f2/f3 < 0.6 \quad (2)$$

where, when the plurality of groups located to an image side of the aperture stop are referred to as rear groups,
frw represents a composite focal length of the rear groups at a wide-angle end;
Ymax represents a maximum image height;
f2 represents a focal length of the second group; and
f3 represents a focal length of the third group,
wherein the rear groups are composed of, from the object side, a fourth group having a positive optical power, a fifth group having a negative optical power, and a sixth group having a positive optical power,
wherein the zoom lens system fulfills conditional formula (4) below:

$$0.2 < f4/f6 < 0.7 \quad (4)$$

where
f4 represents a focal length of the fourth group; and
f6 represents a focal length of the sixth group.

15. The zoom lens system according to claim 14, wherein the fourth and sixth groups move as an integral unit during zooming.

16. The zoom lens system according to claim 14, wherein the zoom lens system achieves camera shake correction by moving the fifth group perpendicularly to an optical axis.

17. The zoom lens system according to claim 14, wherein the fourth and sixth groups move as an integral unit during zooming.

18. The zoom lens system according to claim 14, wherein the zoom lens system achieves camera shake correction by moving the fifth group perpendicularly to an optical axis.

* * * * *